US008600226B2

United States Patent
Hamada et al.

(10) Patent No.: US 8,600,226 B2
(45) Date of Patent: Dec. 3, 2013

(54) FOCUSING METHODS AND APPARATUS, AND RECORDING MEDIA FOR RECORDING THE METHODS

(75) Inventors: Masataka Hamada, Suwon-si (KR); Kenji Ishibashi, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 142 days.

(21) Appl. No.: 13/158,627

(22) Filed: Jun. 13, 2011

(65) Prior Publication Data

US 2012/0051731 A1   Mar. 1, 2012

(30) Foreign Application Priority Data

Aug. 30, 2010  (KR) .................... 10-2010-0084349
Dec. 24, 2010  (KR) .................... 10-2010-0134868

(51) Int. Cl.
*H04N 5/232* (2006.01)
(52) U.S. Cl.
USPC ........... 396/124; 348/345; 348/349; 348/362; 396/18; 396/82
(58) Field of Classification Search
CPC ..................................... H04N 5/232
USPC ............ 359/460; 348/345, 349, 362; 396/18, 396/82, 124
See application file for complete search history.

(56) References Cited

U.S. PATENT DOCUMENTS

| | | | | |
|---|---|---|---|---|
| 4,671,640 A * | 6/1987 | Akada et al. | ................. | 396/135 |
| 4,860,045 A * | 8/1989 | Hamada et al. | ................. | 396/95 |
| 4,967,224 A * | 10/1990 | Hamada et al. | ................. | 396/95 |
| 5,142,318 A * | 8/1992 | Taniguchi et al. | ................. | 396/91 |
| 5,325,146 A * | 6/1994 | Toji | ................. | 396/81 |
| 5,543,839 A * | 8/1996 | Suda et al. | ................. | 348/349 |
| 5,629,735 A * | 5/1997 | Kaneda et al. | ................. | 348/350 |
| 5,694,168 A * | 12/1997 | Toji | ................. | 348/350 |
| 6,590,613 B2 * | 7/2003 | Yasuda | ................. | 348/349 |
| 6,967,686 B1 * | 11/2005 | Tanaka | ................. | 348/352 |
| 7,085,488 B2 * | 8/2006 | Ogino | ................. | 396/133 |
| 7,486,331 B2 * | 2/2009 | Lin | ................. | 348/354 |
| 2001/0000674 A1 * | 5/2001 | Yasuda | ................. | 348/349 |
| 2003/0063212 A1 * | 4/2003 | Watanabe et al. | ................. | 348/349 |
| 2008/0001916 A1 * | 1/2008 | Nozaki et al. | ................. | 345/156 |
| 2008/0007644 A1 * | 1/2008 | Matsumoto | ................. | 348/345 |

(Continued)

FOREIGN PATENT DOCUMENTS

JP   2002-209135 A      7/2002
JP   2007-279677   * 10/2007 ............... G02B 7/28

(Continued)

*Primary Examiner* — Clayton E Laballe
*Assistant Examiner* — Kevin Butler
(74) *Attorney, Agent, or Firm* — Drinker Biddle & Reath LLP

(57) ABSTRACT

Focusing methods, apparatus, and computer-readable recording media having recorded thereon the focusing methods are disclosed. In an example focusing method, a focus evaluation value is divided into first information and second information. The first information represents a difference between focus evaluation values, which are obtained according to location of a focus lens, to be relatively large, and the second information represents the difference to be relatively small. Then, at least one from among the first information and the second information is provided to a user so that the user may easily and more accurately determine whether a subject is in focus.

39 Claims, 22 Drawing Sheets

(56) References Cited

U.S. PATENT DOCUMENTS

| | | | |
|---|---|---|---|
| 2008/0165273 A1* | 7/2008 | Toguchi | 348/349 |
| 2010/0171871 A1* | 7/2010 | Ogino | 348/349 |
| 2011/0050950 A1* | 3/2011 | Nomura | 348/224.1 |
| 2011/0205403 A1* | 8/2011 | Ito | 348/241 |
| 2012/0057062 A1* | 3/2012 | Hamada et al. | 348/333.02 |
| 2012/0062788 A1* | 3/2012 | Sugimoto et al. | 348/349 |

FOREIGN PATENT DOCUMENTS

| | | | |
|---|---|---|---|
| JP | 2007-279677 A | | 10/2007 |
| JP | 2008-129371 | * | 6/2008 |
| JP | 2008-129371 A | | 6/2008 |

\* cited by examiner

FOCUSING METHODS AND APPARATUS, AND RECORDING MEDIA FOR RECORDING THE METHODS

CROSS-REFERENCE TO RELATED PATENT APPLICATION

This application claims the priority benefit of Korean Patent Application No. 10-2010-0084349 filed on Aug. 30, 2010, and Korean Patent Application No. 10-2010-0134868 filed on Dec. 24, 2010 in the Korean Intellectual Property Office, the entireties of which are hereby incorporated by reference.

BACKGROUND

1. Field

The invention relates to focusing apparatus, focusing methods, and recording mediums for recording the methods.

2. Description of the Related Art

When manual focus control is performed, it may not be easy to determine whether a subject is in focus. Thus, conventionally, a captured image of a subject is enlarged to check whether the subject is in focus.

Also, a focus evaluation value is displayed so as to check whether a subject is in focus, as disclosed in Japanese laid-open patent Nos. 2002-209135, 2007-279677, and 2008-129371. However, when fine focus control is performed, it may still be impossible to determine whether a subject is in focus.

SUMMARY

One or more aspects of the disclosed embodiments provide focusing apparatus and methods for easily and more precisely checking a focal state of a subject even when fine focus control is performed, and recording media for recording the methods.

According to an embodiment, there is provided a focusing apparatus including a focus lens; a focus lens driving unit for to move the focus lens in an optical axial direction; an imaging device to generate an image signal by transforming light of an image of a subject, which is incident on the focus lens, into an electrical signal; a focus evaluation value obtaining unit to obtain a focus evaluation value in relation to the image signal; an information generation unit to generate first information and second information from the obtained focus evaluation value, wherein the first information represents a difference between focus evaluation values, which are obtained according to location of the focus lens, to be relatively large, and the second information represents the difference to be relatively small; and a providing unit to provide at least one of the first information or the second information. The first information may represent the same difference between focus evaluation values to be larger than the second information.

According to another embodiment, there is provided a focusing method including generating an image signal by transforming light of an image of a subject, which is incident on the focus lens, into an electrical signal; obtaining a focus evaluation value in relation to the image signal; generating first information and second information from the obtained focus evaluation value, wherein the first information represents a difference between focus evaluation values, which are obtained according to location of the focus lens, to be relatively large, and the second information represents the differ- ence to be relatively small; and providing at least one of the first information or the second information.

According to another embodiment, there is provided a recording medium having recorded thereon a computer program for executing the methods disclosed herein.

BRIEF DESCRIPTION OF THE DRAWINGS

The above and other features of the invention will become more apparent by describing in detail exemplary embodiments thereof with reference to the attached drawings in which.

DETAILED DESCRIPTION

Hereinafter, a digital camera will be described as an example of a focusing apparatus according to the invention in greater detail with reference to the accompanying drawings. In the current embodiment, a digital camera is exemplified as a focusing apparatus according to the invention, but the invention is not limited thereto and may be applied to various digital devices, such as camcorders, personal digital assistants (PDAs), and mobile phones, in which the focusing apparatus is implemented.

Figure 1:
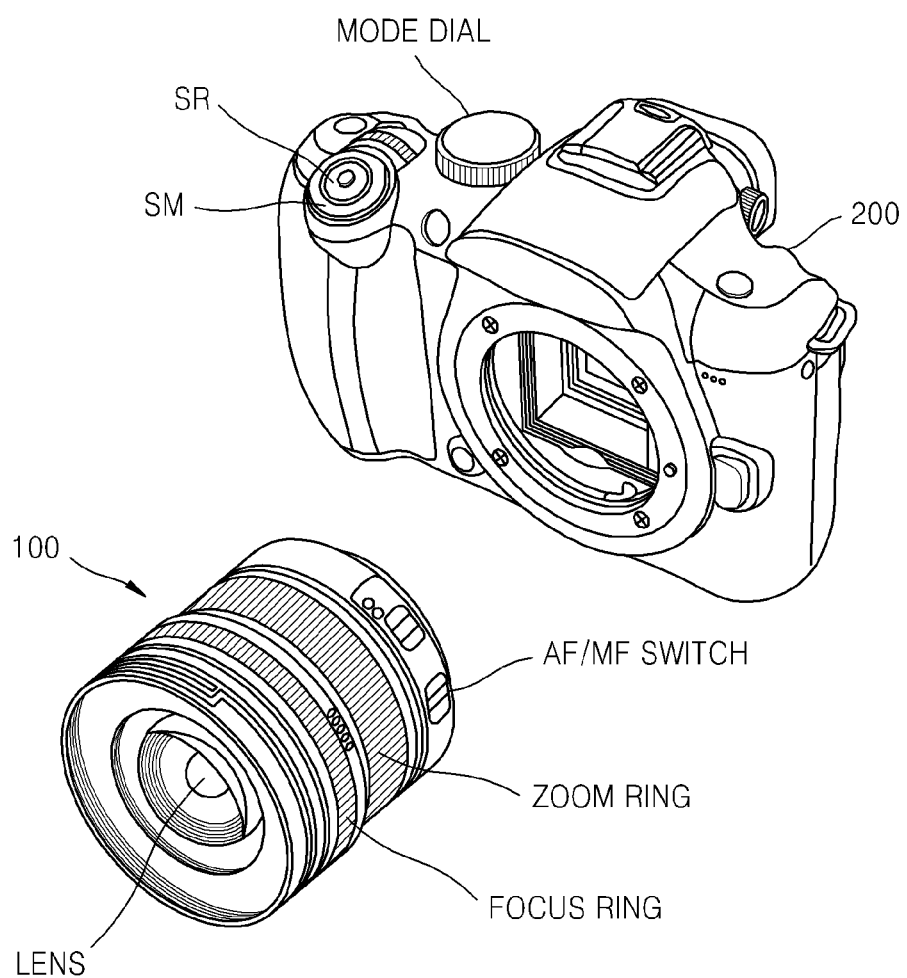
FIG. 1 is a perspective front view of an interchangeable lens digital camera as a focusing apparatus, according to an embodiment.
Figure 2:
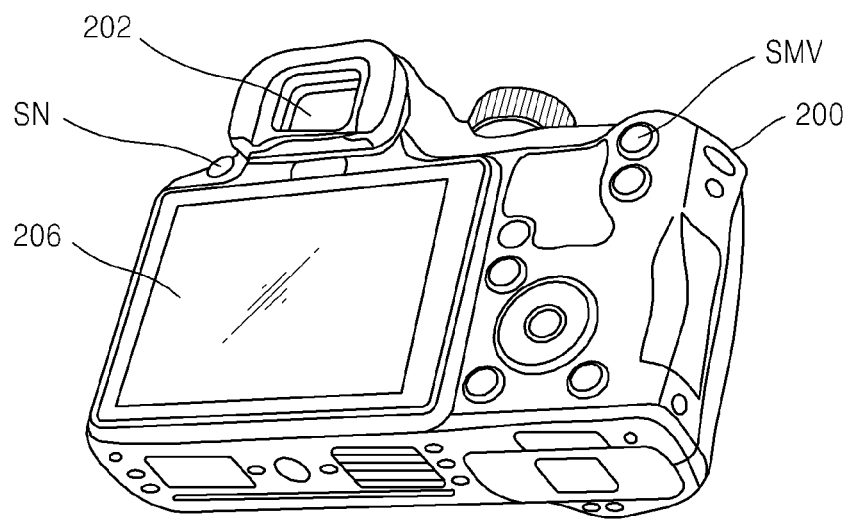
FIG. 2 is a perspective rear view of the interchangeable lens digital camera of FIG. 1.

FIG. 1 is a perspective front view of an interchangeable lens digital camera as a focusing apparatus according to an embodiment. FIG. 2 is a perspective rear view of the interchangeable lens digital camera body of FIG. 1.

Referring to FIG. 1, an interchangeable lens 100 and a body 200 are separable from each other at a front surface of the interchangeable lens digital camera.

The interchangeable lens 100 includes a lens, a zoom ring installed around the lens to change a focal distance of the lens, and a focus ring for performing manual focus control. The interchangeable lens 100 also includes a mode change switch, i.e., an auto focusing/manual focusing (AF/MF) Switch, for switching between an AF mode and an MF mode.

A mode dial is installed on an upper surface of the body 200 so as to generate a user input signal for changing shooting modes for capturing, for example, a still image or a moving picture. A shutter-release (SR) button is further installed on the upper surface of the body 200 to generate another user input signal when the SR button is pressed to a half- or full-pressed state. For example, AF may be performed in the half-pressed state and an image may be captured in the full-pressed state. The body 200 may further include a main switch SM.

Referring to FIG. 2, a button SMV for starting capture of a moving picture is installed on a rear surface of the interchangeable lens digital camera body 200. A viewfinder 202 is further installed on the rear surface of the interchangeable lens digital camera body 200 so as to display information regarding either a captured image or a focus evaluation value when focus control is performed. A display unit 206 is further installed on the rear surface of the interchangeable lens digital camera body 200 so as to display various information in addition to a captured image. A menu button SN is further installed to select an operation of the interchangeable lens digital camera. With the menu button SN, it is possible to select or set whether information regarding the focus evaluation value is to be displayed, whether a captured image is to be enlarged when focus control is performed, or a mode for focus control, e.g., a focusing mode according to a multi-algorithm or a focusing mode according to a selection algorithm, in response to a user input signal.

Operations of the interchangeable lens digital camera will now be described with reference to FIGS. 1 and 2. The interchangeable lens digital camera starts to operate when the main switch SM is turned 'on'. Although in the current embodiment, the interchangeable lens digital camera starts to operate by rotating the main switch SM to a predetermined location, the invention is not limited thereto and the interchangeable lens digital camera may be powered on by manipulating the main switch SM in one of various ways, for example, by pressing or touching the main switch SM.

The interchangeable lens digital camera may display live view images. Live view images may be displayed on the viewfinder 202 or the display unit 206. In the current embodiment, information regarding a focal state (e.g., a FA) may also be displayed. In the current embodiment, the FA is displayed in the form of an image via the viewfinder 202 and/or the display unit 206, but the invention is not limited thereto and the FA may be provided to a user, for example, in the form of an audio signal. The FA may be displayed during MF, i.e., when a user performs focus control by him or herself.

If the SR button SR is pressed to the half-pressed state, then an 'S1' state is 'on' while a live view image is displayed, and AF is performed. A user may perform MF by manipulating the focusing ring.

If a user manipulates the zoom ring, a zoom lens group is moved. If a user manipulates the focus ring, then a location sensor (not shown) that senses the location of a focus lens group may sense the location of the focus ring, and a lens control circuit (not shown) may control the location of the focus lens group to be changed according to a sensing signal. In the case of AF, the focus ring may not be moved even when a user manipulates the focus ring.

If a user presses the SR button in the full-pressed state, then an 'S2' state is 'on' and exposure is performed to capture a still image.

A still image captured by performing exposure when the 'S2' state is 'on' may be recorded on a memory card or the like. The still image may be reproduced on the viewfinder 202 and/or the display unit 206.

Figure 3:
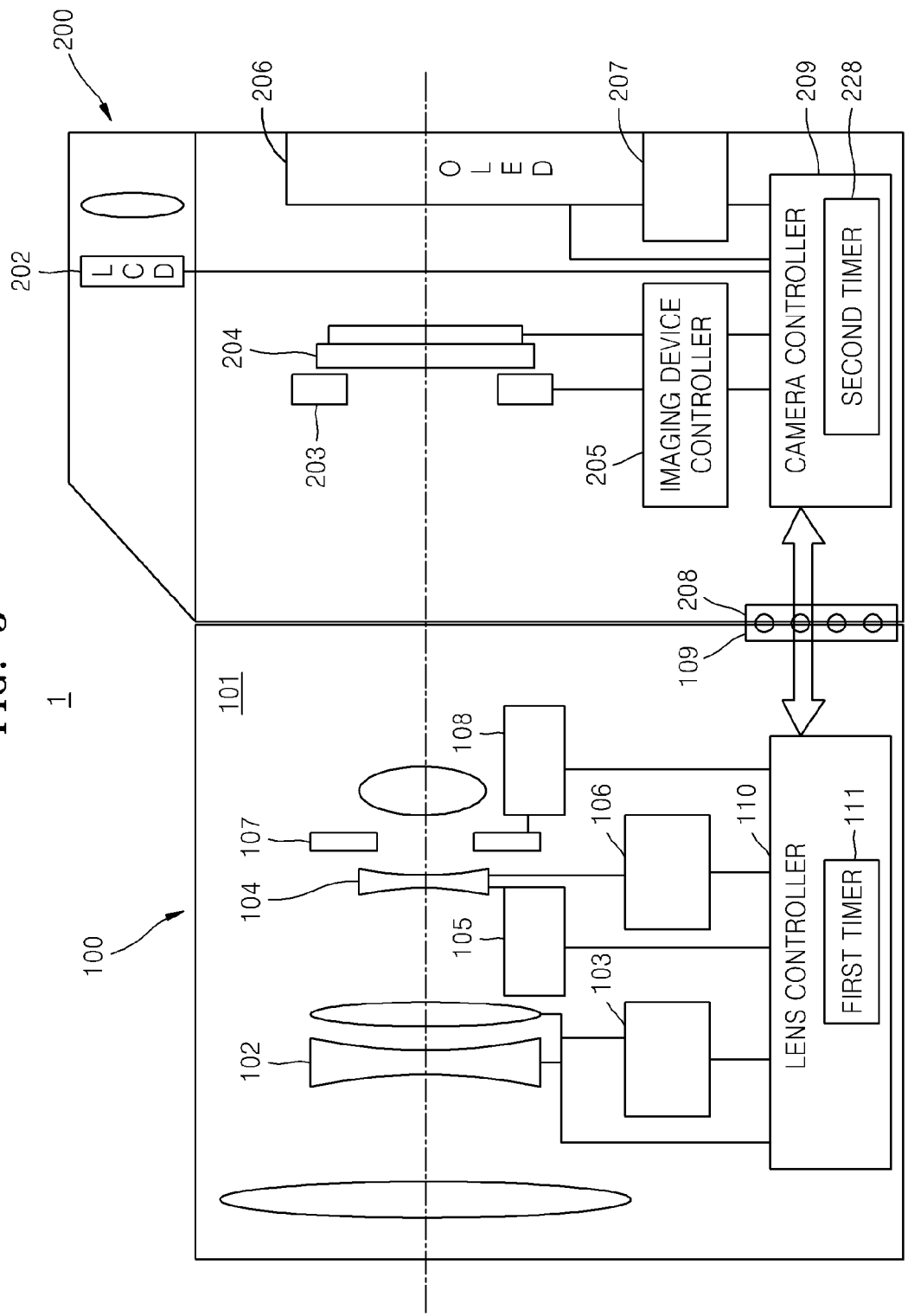
FIG. 3 is a block diagram of an interchangeable lens digital camera, such as shown in FIG. 1, according to an embodiment.

FIG. 3 is a block diagram of an interchangeable lens digital camera 1 such as shown in FIG. 1, according to an embodiment. In the current embodiment, the interchangeable lens digital camera 1 includes an interchangeable lens 100 and a body 200. The interchangeable lens 100 has a focus detection function, and the body 200 has a function of driving a focus lens 104 of the interchangeable lens 100.

Specifically, referring to FIG. 3, the interchangeable lens 100 includes an optical imaging system 101 that includes the zoom lens 102 for performing zoom control and the focus lens 104 for adjusting a focal point, a zoom lens location sensor 103, a focus lens driving unit 105, a focus lens location sensor 106, an aperture 107, an aperture driving unit 108, a lens controller 110, and a lens mount 109.

The zoom lens 102 and the focus lens 104 may form a lens group including a combination of a plurality of lenses.

The zoom lens location sensor 103 and the focus lens location sensor 106 sense the locations of the zoom lens 102 and the focus lens 104, respectively. A time when the location of the focus lens 104 is sensed may be set by the lens controller 110 or a camera controller 209 that will be described below. For example, a time when the location of the focus lens 104 is sensed may be a time when a focal point is detected from an image signal.

The focus lens driving unit 105 and the aperture driving unit 108 may be controlled by the lens controller 110 to drive the focus lens 104 and the aperture 107, respectively. In particular, the focus lens driving unit 105 may drive the focus lens 104 in an optical axial direction.

The lens controller 110 includes a first timer 111 for measuring time. Also, the lens controller 110 transmits location information regarding the sensed location of the focus lens 104 to the body 200. If the location of the focus lens 104 is changed or if the camera controller 209 requests the location information of the focus lens 104, then the lens controller 110 may transmit the location information regarding the sensed location of the focus lens 104 to the body 200. The first timer 111 may be reset according to a reset signal received from the body 200, and times of the interchangeable lens 100 and the body 200 may be synchronized with each other by resetting the first timer 111.

The lens mount 109 may include a communication pin for a lens, and may be engaged with a communication pin of a camera, as will be described below, to be used as a path for transmitting data, a control signal, and so on.

The structure of the body 200 will now be described.

The body 200 may include a viewfinder 202, a shutter 203, an imaging device 204, an imaging device controller 205, a display unit 206, a manipulation unit 207, a camera mount 208, and the camera controller 209.

The viewfinder 202 is an electronic viewfinder, in which a liquid display unit (LCD) is included to display a captured image in real time.

The shutter 203 determines a length of time that light will be supplied to the imaging device 204, i.e., an exposure time.

The imaging device 204 converts light of an image passing through the optical imaging system 101 of the interchangeable lens 100 into an image signal. The imaging device 204 may include a plurality of photoelectric conversion units arranged in a matrix, and a horizontal transmission path for obtaining an image signal by moving electric charges from the plurality of photoelectric conversion units. Examples of the imaging device 204 include a charge-coupled device (CCD) sensor and a complementary metal-oxide semiconductor (CMOS) sensor.

The imaging device controller 205 generates a timing signal, and controls the imaging device 204 to perform capturing, in synchronization with the timing signal. Also, the imaging device controller 205 sequentially obtains horizontal image signals when accumulation of electric charges in each scan line image is completed. The horizontal image signals are used by the camera controller 209 to detect a focal point.

On the display unit 206, various images and various information may be displayed. In the current embodiment, an organic light-emitting diode (OLED) display is illustrated as the display unit 206, but the invention is not limited thereto and other various display devices, e.g., an LCD, may be used.

The manipulation unit 207 is an input unit via which various commands are input by a user so as to manipulate the interchangeable lens digital camera 1. Although not shown, the manipulation unit 207 may include various buttons, e.g., a SR button, a main switch, a mode dial, and a menu button. In the current embodiment, a button, a dial, and the like are exemplified as constitutional elements of the manipulation unit 207, but the inventive concept is not limited thereto and the manipulation unit 207 may further include a touch panel to be installed on the display unit 206.

The camera controller 209 calculates a focus evaluation value by detecting a focal point from an image signal produced by the imaging device 204. Also, the camera controller 209 may store a focus evaluation value at a time that a focal point is detected according to the timing signal produced by the imaging device controller 205, and may calculate the focal point, based on location information of a lens received from the interchangeable lens 100 and the stored focus evaluation value. The result of calculating the focal point is provided to the interchangeable lens 100. The camera controller 209 may include a second timer 228 for measuring time, and may control the second timer 228 to be reset simultaneously with the first timer 111 so that the interchangeable lens 100 and body 200 may measure the same time.

The camera mount 208 includes a communication pin of the camera.

Operations of the interchangeable lens 100 and the body 200 will now be briefly described.

When a subject is photographed, the main switch included in the manipulation unit 207 is manipulated to operate the interchangeable lens digital camera 1. The interchangeable lens digital camera 1 performs a live view display as follows.

Light of the subject, which has passed through the optical imaging system 101, is incident on the imaging device 204. In this case, the shutter 203 is open. The imaging device 204 transforms the light of the subject into an electrical signal so as to produce an image signal. The imaging device 204 operates according to the timing signal produced by the imaging device controller 205. The image signal is transformed by the camera controller 209 into data that can be displayed, and is then output to the viewfinder 202 and the display unit 206. The process described above is referred to as the 'live-view display', and live view images displayed through the live-view display may be consecutively displayed as a moving picture.

After the live-view display is performed, when the SR button, which is one of the elements of the manipulation unit 207, is pressed to the half-pressed state, the interchangeable lens digital camera 1 begins AF. AF is performed using the image signal produced by the imaging device 204. In the case of contrast AF, the location of the focus lens 104 is detected from a focus evaluation value corresponding to a contrast value, and the focus lens 104 is driven according to the detected location. The focus evaluation value is calculated by the camera controller 209. The camera controller 209 calculates information for controlling the focus lens 104 from the focus evaluation value, and transmits the information to the lens controller 110 via the communication pins of the lens mount 109 and the camera mount 208.

The lens controller 110 controls the focus lens driving unit 105 based on the received information, and then the focus lens driving unit 105 drives the focus lens 104 in an optical axial direction so as to perform AF. Feedback control is performed by monitoring the location of the focus lens 104 by the focus lens location sensor 106.

When zooming is performed by a user manipulating the zoom lens 102, the zoom lens location sensor 103 detects the location of the zoom lens 102. The detected location of the zoom lens 102 may be used by the lens controller 110 to AF control the focus lens 104 or may be used for the other control functions.

When an image of a subject is in focus, the SR button is pressed to the full-pressed state so as to turn the 'S2' state on, and then the interchangeable lens digital camera 1 performs exposure. In this case, the camera controller 209 completely closes the shutter 203, and transmits all light measurement information, which is obtained by the lens controller 110, as aperture control information. The lens controller 110 controls the aperture driving unit 108 based on aperture control information, and adjusts an opening size of the aperture 107. The camera controller 209 controls the shutter 203 based on the information of light measurement, and opens the shutter 203 for an appropriate exposure time so as to capture an image of a subject photographed.

An image signal of the captured image is processed and compressed, and is then stored in a memory card. The captured image may be displayed on the viewfinder 202 and the display unit 206. A mode, in which an image of a subject photographed is directly displayed instead of using the reproducing mode, is referred to as a 'quick view mode', and an image displayed in the quick view mode is referred to as a 'quick view image'.

Figure 4:
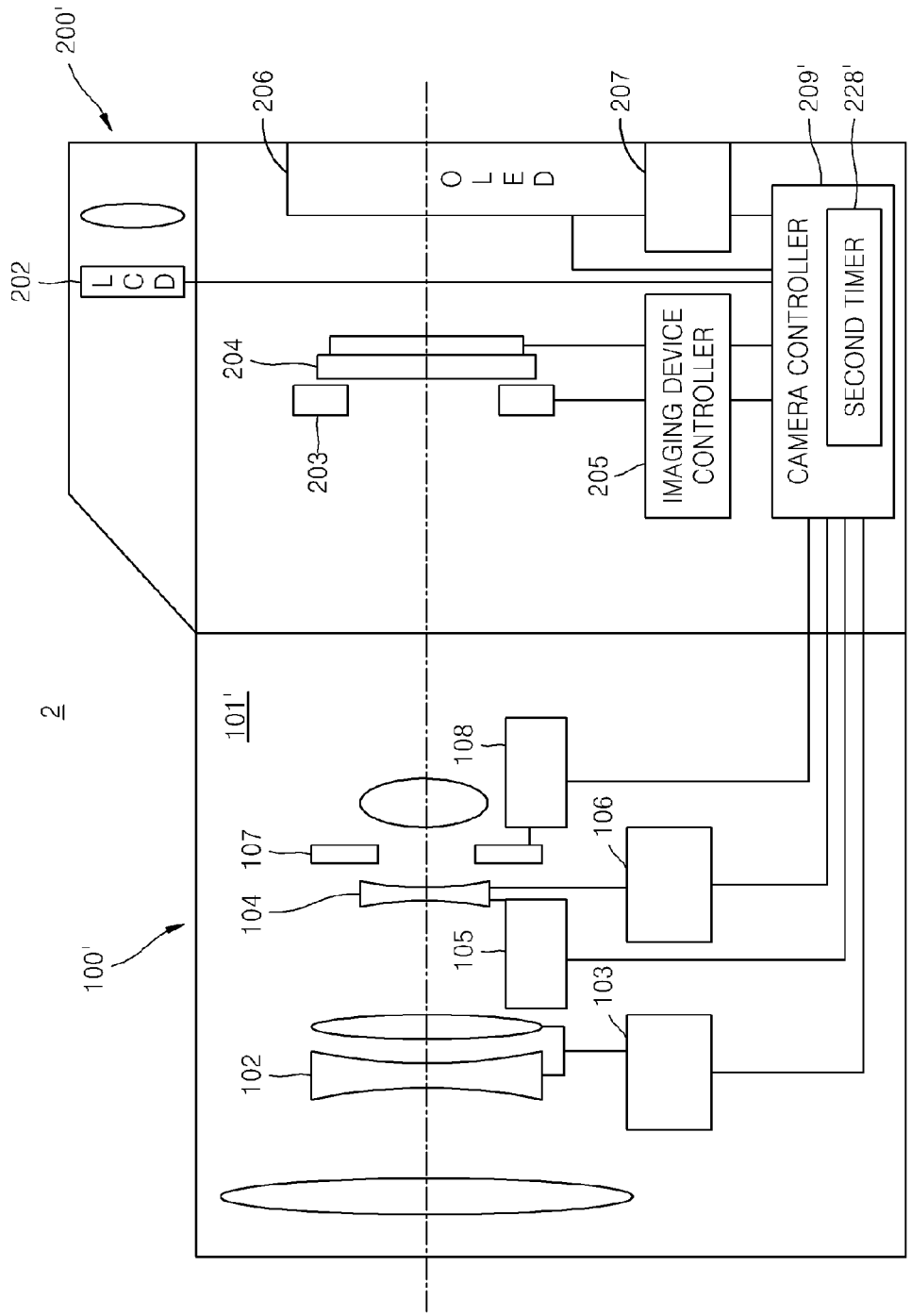
FIG. 4 is a block diagram of a compact digital camera as a focusing apparatus, according to another embodiment.

FIG. 4 is a block diagram of a compact digital camera 2 as a focusing apparatus according to another embodiment. In the compact digital camera 2, according to the current embodiment, a lens 100' cannot be interchanged, i.e., is not detachable from a body 200', unlike the interchangeable lens 100 of the digital camera 1 of FIG. 3. The compact digital camera 2 according to the current embodiment will now be described focusing on the differences between the compact digital camera 2 and the interchangeable lens digital camera 1 of FIG. 3.

Referring to FIG. 4, the compact digital camera 2 includes the lens unit 100' and the body 200', wherein the lens unit 100' cannot be user replaced with another lens unit. Also, because the lens unit 100' and the body 200' are formed in one body, the compact digital camera 2 does not include the lens mount 109 and the camera mount 208 included in the interchangeable lens digital camera 1 of FIG. 3. Thus, a camera controller 209' directly controls a lens driving unit 105', an aperture driving unit 108, and the other elements. In the current embodiment, the lens driving unit 105' may drive an optical imaging system 101' under control of the camera controller 209'. The optical imaging system 101' may include a zoom lens 102 and a focus lens 104. The aperture driving unit 108 may also drive the aperture 107 under control of the camera controller 209'. The camera controller 209' receives directly location information of a zoom lens 102 from a zoom lens location sensor 103 or a focus lens location sensor 106. That is, in the current embodiment, the camera controller 209' may also perform the function of the lens controller 110 of FIG. 3 described above. Also, in the current embodiment, a second timer 228' may be used to synchronize a focus evaluation value with the location of the focus lens 104.

Figure 5:
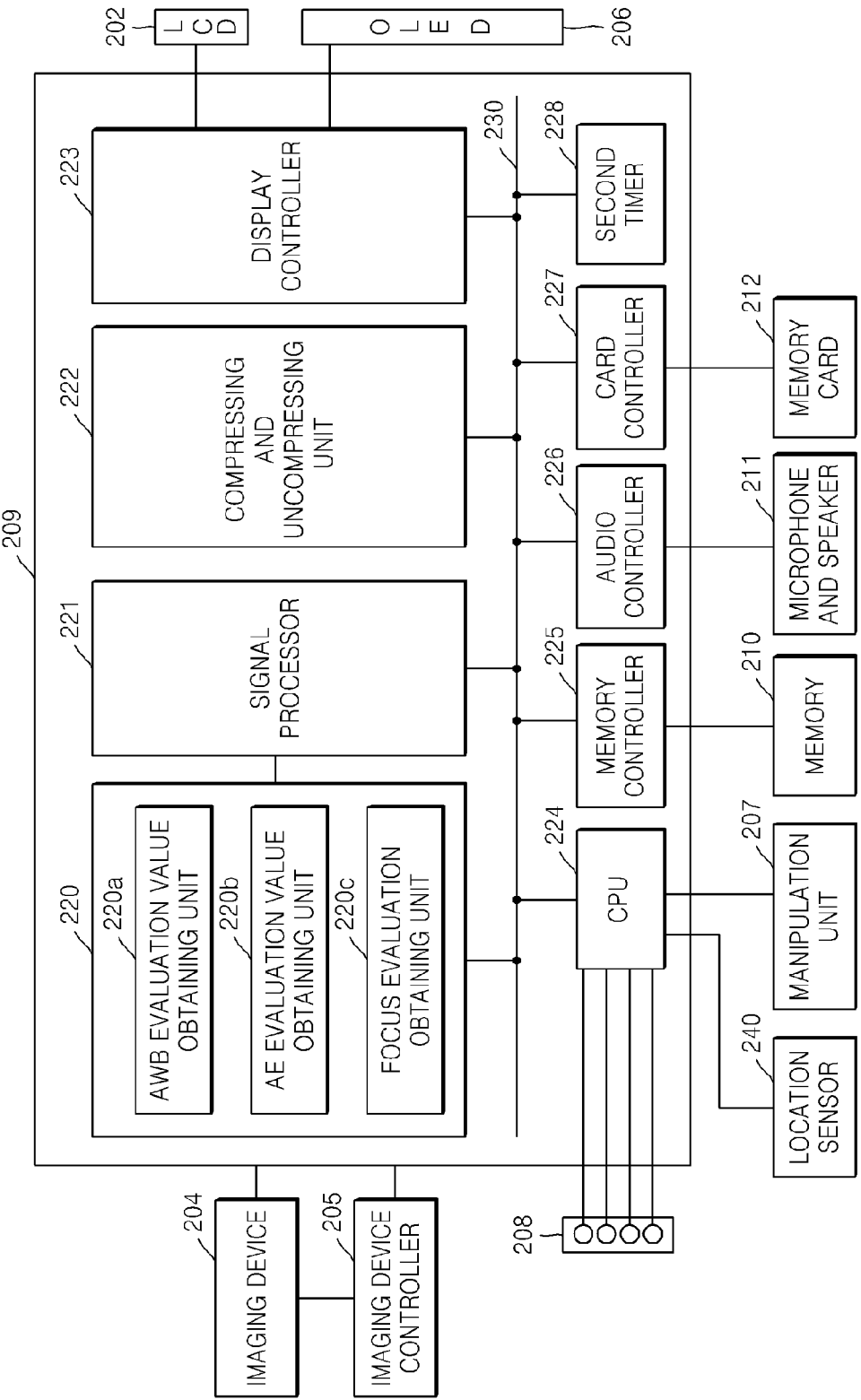
FIG. 5 is a block diagram specifically illustrating a camera controller included in the interchangeable lens digital camera of FIG. 1, according to an embodiment.

FIG. 5 is a block diagram specifically illustrating the camera controller 209 included in the interchangeable lens digital camera 1 of FIG. 1, according to an embodiment. In the current embodiment, the camera controller 209 of the interchangeable lens digital camera 1 illustrated in FIG. 3 is used, but the invention is not limited thereto and the structure of the camera controller 209 may also apply to the camera controller 209' of the compact digital camera 2 illustrated in FIG. 4. The camera controller 209' of FIG. 4 further includes the lens controller 110 compared to the camera controller 209 of FIG. 3.

Referring to FIG. 5, the camera controller 209 may include a pre-processor 220, a signal processor 221, a compressing/uncompressing unit 222, a display controller 223, a CPU 224, a memory controller 225, an audio controller 226, a card controller 227, the second timer 228, a main bus 230, and so on.

The camera controller 209 transmits various commands and data to the other elements via the main bus 230.

The pre-processor 220 includes an auto white balance (AWB) evaluation value obtaining unit 220a that receives an image signal produced by the imaging device 204 and calculates an AWB evaluation value for white balance control, an auto exposure (AE) evaluation value obtaining unit 220b that calculates an AE evaluation value for exposure control, and a focus evaluation value obtaining unit 220c that calculates a focus evaluation value for focus control.

The signal processor 221 performs a series of image signal processes, such as gamma correction, so as to produce a live view image or a captured image that can be displayed on the display unit 206 and the view finder 202.

The compressing/uncompressing unit 222 compresses and uncompresses an image signal that is image-signal processed. For example, an image signal is compressed in a joint photographic experts group (JPEG) format or an H.264 compression format. An image file that includes the compressed image signal is stored in a memory card 212.

The display controller 223 controls an image to be output to the viewfinder 202 or the display unit 206.

The CPU 224 controls all operations of other elements. In the compact digital camera 2 of FIG. 4, the CPU 224 controls the zoom lens 102 and the focus lens 104.

The memory controller 225 controls a memory unit 210 that temporarily stores a captured image of a subject photographed or data, such as calculated values, and the audio controller 226 controls a microphone and speaker 211. The card controller 227 controls the memory card 212 to which a captured image is recorded.

The second timer 228 is reset simultaneously with the first timer 111 to measure time.

Operations of the camera controller 209 will now be briefly described.

When a manipulation signal is input to the CPU 224 from the manipulation unit 207, the CPU 224 operates the imaging device controller 205. The imaging device controller 205 outputs a timing signal to operate the imaging device 204. When an image signal is input from the imaging device 204 to the pre-processor 220, AWB and AE are performed. The results of performing AWB and AE are fed back to the imaging device controller 205 so as to obtain an image signal that has an appropriate color and is exposed to light to an appropriate level, from the imaging device 204.

When the compact digital camera 2 operates to perform a live view display, the camera controller 209 inputs an image signal captured for an appropriate exposure time to the pre-processor 220 so as to calculate an AE evaluation value, an AWB evaluation value, a focus evaluation value, and so on. An image signal for a live view display may be supplied to the signal processor 221 directly and not via the main bus 230, and may then be image signal processed, e.g., interpolation of pixels. The image signal that has been image signal processed may be displayed on the viewfinder 202 and the display unit 206 via the main bus 230 and the display controller 223. The live view display may be periodically updated at intervals of 60 fps (frame per second), but the invention is not limited thereto and the live view display may be periodically updated at intervals of 120 fps, 180 fps, or 240 fps. The cycle of updating may be set by the CPU 224 according to the result of light measurement or AF conditions, and may be controlled according to a timing signal produced by the imaging device controller 205.

When the SR button is pressed to the half-pressed state, the CPU 224 senses an S1 signal corresponding to the half-pressed state, and instructs the lens controller 110 to start driving of the focus lens 104 for AF, via the communication pins of the camera mount 208 and the lens mount 109. As another example, when the CPU 224 senses the S1 signal corresponding to a half-pressed signal, the CPU 224 may control driving of the focus lens 104 for AF. That is, the CPU 224 may be an example of a main controller.

Also, the CPU 224 obtains an image signal from the imaging device 204, and the focus evaluation value obtaining unit 220c of the pre-processor 220 calculates a focus evaluation value. The focus evaluation value is calculated according to movement of the focus lens 104. A location of the focus lens 104 when an image of a subject has a maximum contrast is detected from changes in the focus evaluation value, and the focus lens 104 is moved to the detected location. For example, the location of the focus lens 104 may correspond to a maximum focus evaluation value. The operations of the camera controller 209 described above are an AF operation. Live view images may be consecutively displayed even in the AF operation. An image signal used to display a live view image may be the same as an image signal used to calculate a focus evaluation value.

In the case of the interchangeable lens digital camera 1 employing the digital interchangeable lens 100 illustrated in FIG. 3, communication may be conducted between the interchangeable lens 100 and the body 200 via communication pins of the camera mount 208 and the lens mount 109, during the AF operation. The communication pins operate in a serial communication mode so as to transmit lens information or control information at periodic times. A time delay may occur during such serial communication. However, location information of the focus lens 104 should be recorded consecutively without a time delay for precise AF. The time delay should be controlled to be substantially shorter than a moving speed of the focus lens 104 so as to inform the interchangeable lens 100 of a time that the body 200 obtains a focus evaluation value or so as to reduce a time needed to transmit the location information of the focus lens 104 from the interchangeable lens 100 to the body 200. However, it is not feasible to arbitrarily shorten a time delay in serial communication. Thus, communication pins may be installed for synchronization control. However, when communication pins are further installed only for synchronization control, the total number of communication pins increases, thus leading to an increase in the sizes of the camera mount 208 and the lens mount 109 and an increase in manufacturing costs. To solve this problem, in the current embodiment, a timer function is employed in the interchangeable lens 100 and the body 200 for synchronization control. Also, a particular communication pin is set to initially operate in a real-time communication mode, and is set to then operate in a serial communication mode after the timer function of the interchangeable lens 100 is reset according to real-time communication.

The imaging device 204 may obtain a peak location of a focus evaluation value according to a track of the location of the focus lens 104 obtaining an image signal and a change in the focus evaluation value.

FIGS. 6 to 9 are block diagrams of various examples of CPUs 224a, 224b, 224c, and 224d that may be included in the camera controller 209 of FIG. 5, according to embodiments. In these embodiments, a CPU performs focusing operations, but the invention is not limited thereto and at least some or all of the focusing operations may be performed by a device installed apart from the CPU or may be added to operations of another device, such as the signal processor 221.

Figure 6:
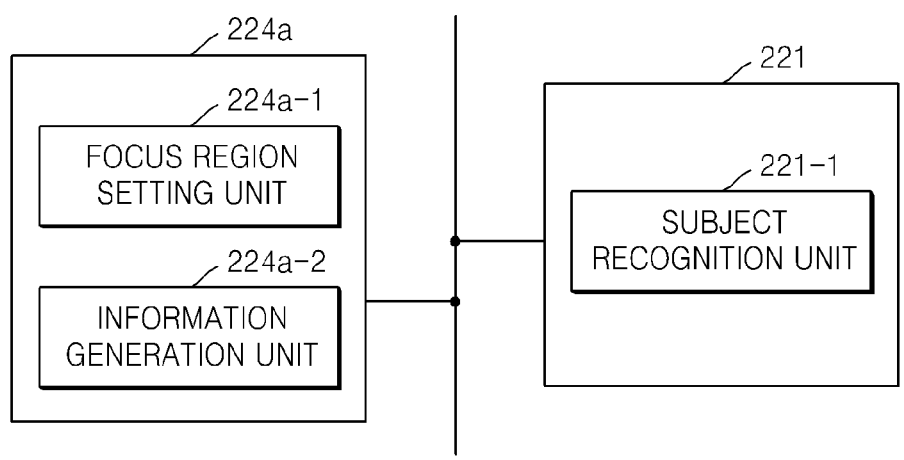
FIGS. 6 to 9 are block diagrams of various examples of central processing units (CPUs) that may be included in the camera controller of FIGS. 1 through 5, according to embodiments.

Referring to FIG. 6, the CPU 224a, according to one embodiment, includes an information generation unit 224a-2 that generates first information for representing the difference between focus evaluation values obtained from the focus evaluation value obtaining 220c to be relatively large, and second information for representing the difference to be relatively small.

For example, the first information may be an addend of a focus evaluation value and the second information may be an exponent of the focus evaluation value. Otherwise, the first information may be a linear arithmetic value of an addend of a focus evaluation value, and the second information may be a linear arithmetic value of an exponent of the focus evaluation value. The linear arithmetic value may be calculated by a linear formula through which a large linear arithmetic value is obtained when a focus evaluation value is large. As another example, the first information may be significant binary figures of a focus evaluation value, and the second information may be a shift number of the binary figures.

For example, a focus evaluation value may be greater than '0' and less than or equal to a number of several hundred digits, and may be greater than '100' and less than or equal to a number of several hundred digits even when noise components are excluded. The focus evaluation value may be expressed as '$A*N^B$' by using an exponent. Here, 'A' denotes an addend, 'N' denotes a cardinal number, and 'B' denotes an exponent. For example, if the focus evaluation value is '100', then the focus evaluation value may be expressed as '$1*10^2$' when N=10, and thus, A=1 and B=2. If the focus evaluation value is '50,000,000', then the focus evaluation value may be expressed as '$5*10^6$' when N=10, and thus, A=5 and B=6. The above cases are where the decimal system is used. If the binary system is used, then N=2. If the focus evaluation value is '100', then the focus evaluation value may be expressed as '$1.5625*2^6$' when N=2, and thus, A=1.5625 and B=6. If the focus evaluation value is '50,000,000', then the focus evaluation value may be expressed as '$1.192*2^{22}$' when N=2, and thus, A=1.192 and B=22. Here, in the case of a FA, an exponent may '22', and an addend may be '19', which are decimal numbers. A maximum value, i.e., a maximum scale range, of the focus evaluation value may be determined by setting an exponent to '25' and an addend to '99', so that a user can easily check the focus evaluation value.

As another example, C=(B−2)*10. When the sum of A and B is graphically expressed by directly using an exponent and an addend, a small value may be prevented from being graphically expressed to be relatively larger than a large value.

If a focus evaluation value is '5,000,000', the focus evaluation value may be expressed as '$5*10^6$' when N=10, and thus, A=5 and B=6. The addend A denotes the first information presenting the difference between focus evaluation values to be large, i.e., a minute part presenting the difference in a detailed manner. The exponent B denotes the second information presenting the difference to be small, i.e., a coarse part presenting the difference in a compressive manner.

Here, because the addend A ranges from 1 to 10 and the exponent B ranges from 0 to 6, C ranges from 0 to 40. If the whole maximum scale is set to '50', then focus evaluation values from 100 to ten millions may be expressed using the values A and C. Here, the reason why a minimum value of the focus evaluation values is set to '100' is because that '0' from '100' are values that are not reliable when image noise is considered. Thus, the greater a focus evaluation value, the larger information unit may be displayed to a user.

According to another embodiment, if the binary system is used, i.e., if N=2, binary figures are shifted in the right direction until in the CPU 224a, the upper six bits of a focus evaluation value are obtained when a number of significant figures are defined, for example, as upper six bits. Because significant figures of the upper six bits range from 0 to 63 in the decimal system, a number of times that the binary figures are shifted means an exponent of '2'. For example, if the binary figures are shifted fifteen times in the right direction until significant figures of '63' are definitely determined, then the focus evaluation value is expressed as '$63\times2^{15}$'. In this case, '63' is the first information which is a minute part, and '15' is the second information which is a coarse part.

At least one from among the first information and the second information generated by the information generation unit 224a-2 may be provided to a user. For example, the first information or the second information may be provided to a user by representing the first or second information in the form of an image and displaying the image on the display unit 206. The image may be presented, for example, in the form of a bar image, a block image, or an arrow image. Thus, examples of a unit of providing the first or second information to a user (not shown) (hereinafter referred to as a 'providing unit'), according to an embodiment, may include the display controller 223, the viewfinder 202, and/or the display unit 206.

Otherwise, the first or second information may be output in the form of an audio signal via a speaker. The first or second information may be provided to a user according to one of other various methods. In this case, examples of a providing unit (not shown) according to another embodiment may include the audio controller 226 and the microphone/speaker 211.

In the current embodiment, the CPU 224a may further include a focus region setting unit 224a-1 that sets a focus region in an image produced by the imaging device 204. The focus region may be a central region of the image. Otherwise, the focus region may be a region selected by a user via the manipulation unit 207. The signal processor 221 may also include a subject recognition unit 221-1 that recognizes a subject, and the focus region may be at least one part of a region of the subject that is recognized by the subject recognition unit 221-1. For example, the subject recognition unit 221-1 may include a face recognition unit (not shown) and may obtain a face region as the focus region from the image. The focus region setting unit 224a-1 may set a focus region including at least one part of the obtained face region.

In the current embodiment, during MF, a focus evaluation value may be provided to a user by dividing the focus evaluation value into first information (minute part) and second information (coarse part). A user may set an MF mode by using an AF/MF switch of a manipulation unit or may allow the MF mode to be automatically set by manipulating a focus ring as a focus driving unit (not shown). Accordingly, a focus evaluation value may be obtained from an image signal received via the focus lens 104 moved by the user, the focus evaluation value may be divided into first information (minute part) and second information (coarse part), and then, the first information and/or the second information may be provided to the user. For this reason, the user may check a focused state more precisely in the MF mode than in the AF mode.

Also, in the current embodiment, a change in focus evaluation values according to location of a focus lens may be provided to the user. Specifically, a change in the first information and/or the second information each of focus evaluation values according to location of the focus lens may be provided to the user. For example, a change in the first or second information may be displayed in the form of a bar image on the display unit 206. Thus, the user may check a trace of a change in the focus evaluation values before and after a predetermined time.

Also, the first information and the second information may be displayed in the form of an image by using various colors or shapes. For example, the first information and the second information may be displayed using the same color and/or shape.

CPUs according to other various embodiments of the invention will now be described focusing on the differences between them and the CPU 224a of FIG. 6, in which a description of the same elements will be omitted.

Figure 7:
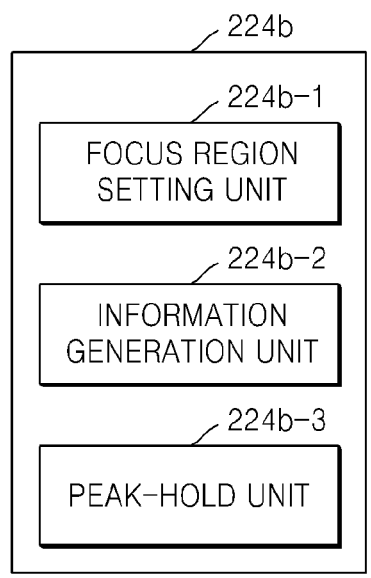

The CPU 224b according to another embodiment is described as follows with reference to FIG. 7. Referring to FIG. 7, the CPU 224b includes a focus region setting unit 224b-1, an information generation unit 224b-2, and a peak hold unit 224b-3.

The peak hold unit 224b-3 generates peak value information corresponding to a maximum value from among all focus evaluation values obtained by the focus evaluation value obtaining unit 220c of FIG. 5. The peak value information may be displayed, for example, via a display unit or a viewfinder. A peak value may be held by displaying a peak value for a predetermined time from among focus evaluation values according to location of a focus lens.

In the current embodiment, a providing unit (not shown) may further provide a user with the peak value information presenting the peak value. For example, the first information and the second information may be provided as the peak value information presenting the peak value in the form of an image or an audio signal. Specifically, when the first information and the second information are displayed in the form of a bar image, the peak value may be displayed as a reference image of the bar image. This will be described in greater detail with reference to the accompanying drawings.

Figure 8:
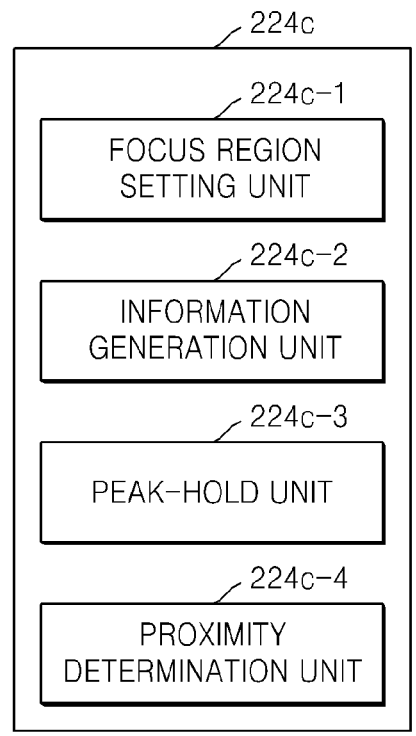

The CPU 224c according to another embodiment will be described below with reference to FIG. 8. Referring to FIG. 8, the CPU 224c includes an information generation unit 224c-2 and a proximity determination unit 224c-4. The proximity determination unit 224c-4 determines whether a subject is located in a proximity region. If it is determined that the subject is located in the proximity region, then a providing unit may further provide a user with proximity information. For example, a word 'NEAR' may further be displayed as the proximity information on a display unit. Thus, the proximity information may be provided to a user together with the first information and/or the second information. Specifically, the proximity information may be displayed together with the first information and/or the second information. Otherwise, when a subject is located in the proximity region, providing of the first information and the second information may be skipped. That is, the first information and the second information may not be provided. For example, the first information and the second information may not be displayed on the display unit 206.

In the current embodiment, the CPU 224c may also further include a focus region setting unit 224c-1.

Also, the CPU 224c may further include a peak hold unit 224c-3. A providing unit (not shown) may further provide peak value information produced by the peak hold unit 224c-3 and may not provide the peak value information when the proximity determination unit 224c-4 determines that a subject is located in a proximity region. For example, an image corresponding to the peak value information may not be displayed when the proximity determination unit 224c-4 determines that the subject is located in the proximity region.

Figure 9:
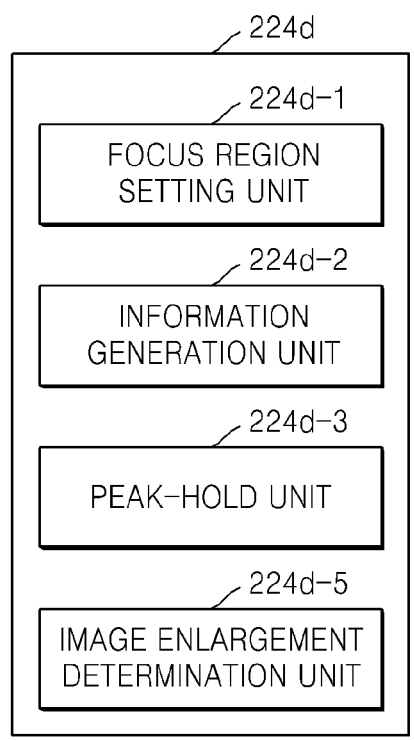

The CPU 224d according to another embodiment is described as follows with reference to FIG. 9. Referring to FIG. 9, the CPU 224d includes an information generation unit 224d-2 and an image enlargement determination unit 224d-5. The image enlargement determination unit 224d-5 determines whether an image corresponding to an image signal is to be enlarged. For example, if the manipulation unit 207 of FIG. 5 generates an enlargement control signal, the image enlargement determination unit 224d-5 may determine that the image is to be enlarged.

If the image is to be enlarged, then a providing unit (not shown) may not provide the first information and the second information. For example, an image of the first information and an image of the second information may not be displayed on the display unit 206. Otherwise, if the image is to be enlarged, enlargement information of the image may further be provided to a user. That is, the enlargement information of the image may be provided to a user in addition to the first information and/or the second information. For example, the word 'ENLARGE' may further be displayed as the enlargement information of the image, together with the first information and/or the second information.

In the current embodiment, the CPU 224d may also further include a focus region setting unit 224d-1.

Also, the CPU 224d may further include a peak hold unit 224d-3. A providing unit (not shown) may further provide peak value information produced by the peak hold unit 224d-3 and may not provide the peak value information when the image enlargement determination unit 224d-5 determines that the image is to be enlarged. For example, an image corresponding to the peak value information may not be displayed when the image enlargement determination unit 224d-5 determines that the image is to be enlarged.

Setting of a focus region will now be described in detail with reference to FIGS. 10 to 14.

Figure 10:
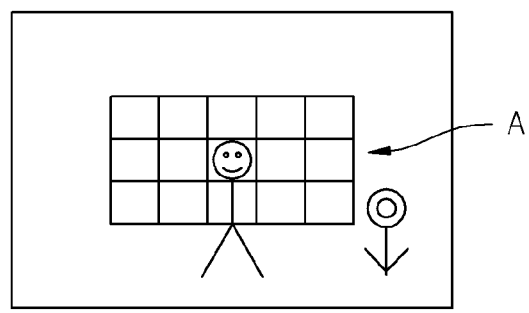
FIG. 10 is a diagram illustrating a focus region that is automatically detected as a main subject region, according to an embodiment.

FIG. 10 is a diagram illustrating a focus region that is automatically detected as a main subject region, according to an embodiment. Referring to FIG. 10, a region of an image is divided into fifteen equal parts, one of the fifteen parts is determined as a region in which a main subject is included, and the determined region is set as a focus region. The determining of the region in which the main subject is included may be performed by analyzing a distribution of focus evaluation values in each of the fifteen parts with an automatic multi-division focus region obtaining algorithm. One of the fifteen parts, in which there is a peak value from among the focus evaluation values, may be set as the focus region.

Figure 11:
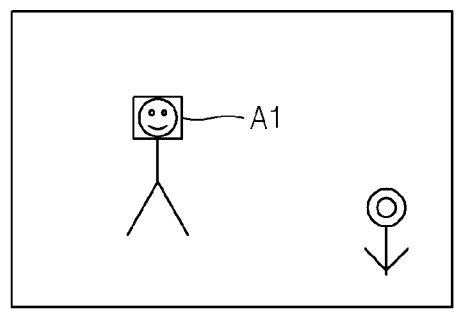
FIGS. 11 and 12 are diagrams illustrating examples of a focus region selected by a user, according to embodiments.
Figure 12:
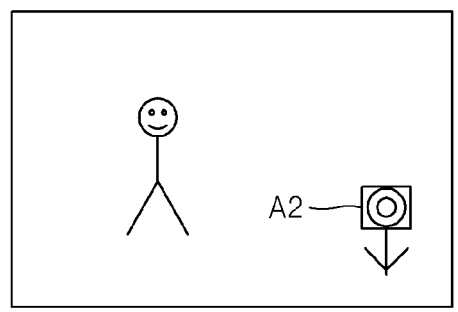

FIGS. 11 and 12 are diagrams illustrating examples of a focus region selected by a user, according to embodiments.

The user may set a specific region of a captured image as a focus region via a manipulation unit. Also, the user may adjust the size of the specific region. Thus, the location and size of a focus region that is to be set may also be changed. Also, a plurality of regions of the captured image may be selected, and a plurality of focus regions may thus be set.

Specifically, FIG. 11 illustrates setting of a focus region A1 by selecting a person region. FIG. 12 illustrates setting of a focus region A2 by selecting a flower region.

Figure 13:
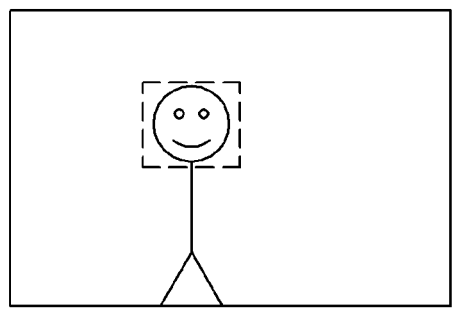
FIG. 13 is a diagram illustrating a focus region including a face region recognized according to a face algorithm, according to an embodiment.

FIG. 13 is a diagram illustrating a focus region including a face region recognized according to a face algorithm, according to an embodiment. The face region may be detected using a subject recognition algorithm, e.g., the face algorithm, and the outline of the face region may be indicated with a dashed line. The detected face region may be set as a focus region.

Although a face algorithm is used in the current embodiment, the invention is not limited thereto and a focus region may be set using one of the other various subject recognition algorithms for recognizing animals, plants, objects, scenes, and so on.

Information regarding a focal state, i.e., a FA, may be obtained according to image information of the focus region, and may be provided to a user. The user may perform precise focus control based on the FA. For example, when a captured image of a subject is to be finely modified, the subject is moved or focus control is to be finely performed on the captured image, the FA may be used as helpful information for a user.

Also, based on the FA, the user may perform focus control rapidly when at least one of the cases described above occurs in an AF mode, and may perform focus control more effectively when manual focusing is performed only by manipulating a focus ring without changing modes.

Providing of information regarding a focal state of a subject, i.e., a FA, according to embodiments, will now be described in detail with reference to FIGS. 14 to 28.

Figure 14:
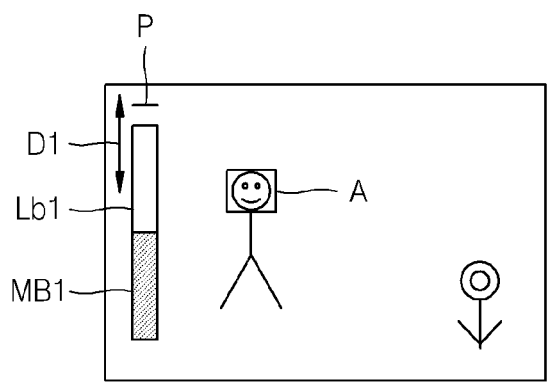
FIGS. 14 to 30 are diagrams illustrating information regarding a focal state, i.e., a focus aid (FA), in relation to focusing apparatus and methods, according to embodiments.

Referring to FIG. 14, first information (minute part) and second information (coarse part) of a focus evaluation value obtained in relation to a focus region A may be presented in the form of a bar image. For example, the first information may be displayed in the form of a light-colored bar image Lb1 and the second information may be displayed in the form of a deep-colored bar image Mb1 on a display unit. In FIG. 14, a double-head arrow D1 denotes vertical movement of the bar image Lb1 and the bar image Mb1. That is, the sizes of the bar images Lb1 and Mb1 may be vertically increased or decreased according to the focus evaluation value.

In the current embodiment of FIG. 14, the bar images Mb1 and Lb1 are vertically displayed as the first information and the second information on a left part of a screen of the display unit, respectively. However, the invention is not limited thereto and the bar images Mb1 and Lb1 may be displayed on a right part of a screen of the display unit.

Referring to FIG. 14, a fine line image P is indicated above the bar image Lb1, which is the first information (minute part). The line image P denotes peak value information. In other words, the line image P denotes information corresponding to a maximum value from among all of focus evaluation values obtained. The line image P may be continuously displayed as the peak value information, together with the first information and the second information, and may be updated. Otherwise, the line image P may be continuously displayed for a predetermined time or periodically. Thus, a user may easily determine the focal state of the subject by not only checking a current size of the focus evaluation value but also checking the peak value information.

Figure 15:
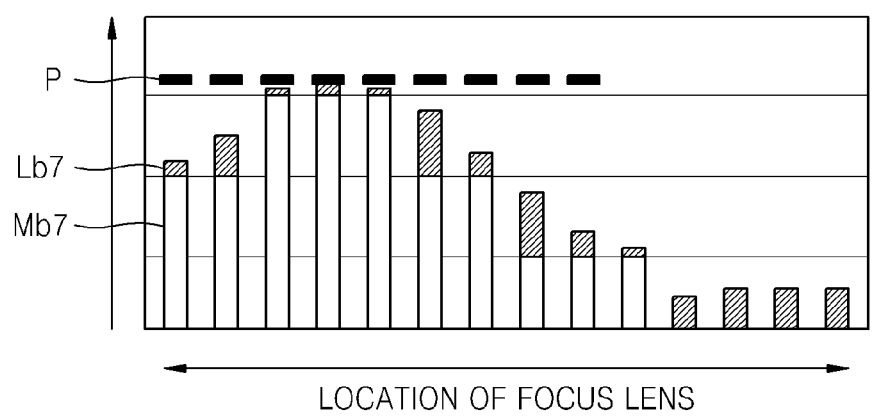

FIG. 15 is a graph illustrating a change in a focus evaluation value according to the location of a focus lens moved by manipulating a focus ring, in which this change is indicated using first information A (minute part) and second information C (coarse part), according to an embodiment of the invention. Referring to FIG. 15, the vertical axis of the graph denotes contrast values that are focus evaluation values, and each of the bar images may be divided into two parts. In each of the bar images, the first information A is indicated in an upper part and the second information C is indicated in a lower part in relation to the above equation C=(B−2)*10. Here, 'A' and 'B' denote an addend of and an exponent of each of the focus evaluation values, respectively. In FIG. 15, 'A' may be indicated as 'Lb7', and 'C' may be indicated as 'Mb7'. The location of the second information C, which is a maximum value when the focus ring is manipulated, is indicated for a predetermined time. The maximum value may be considered as a peak value, and peak value information corresponding to the peak value may be produced and displayed for the predetermined time. That is, a line image P indicating peak-hold may further be displayed above each of the bar images.

Figure 16:
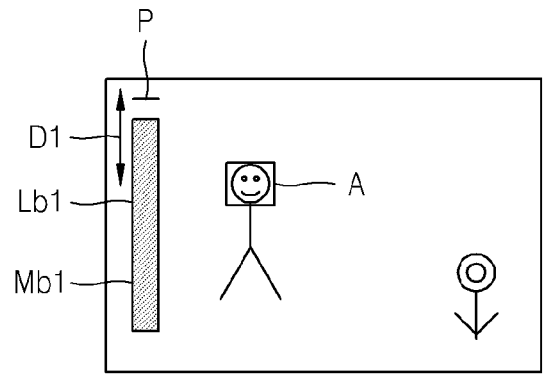

A bar image illustrated in FIG. 16 may be a bar image corresponding to current location of the focus lens from among the bar images shown in the graph of FIG. 15. Referring to FIG. 16, first information Lb1 and second information Mb1 may be illustrated using the same shape and color so that a focus evaluation value may be provided to a user as single information that is not divided into parts.

Figure 17:
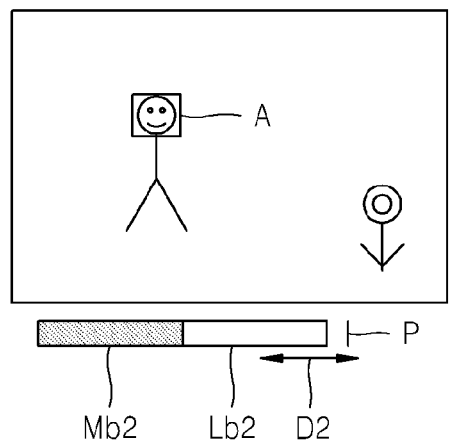

As another example, referring to FIG. 17, the first information may be displayed in the form of a light-colored bar image Lb2 and the second information may be displayed in the form of a deep-colored bar image Mb2, on a lower part of a display unit. In the current embodiment illustrated in FIG. 17, a double-head arrow D2 may further be displayed on the lower part of the display unit so as to indicate horizontal movement of the bar image. In the current embodiment, a line image P may further be displayed as peak value information indicating a peak value from among focus evaluation values.

Figure 18:
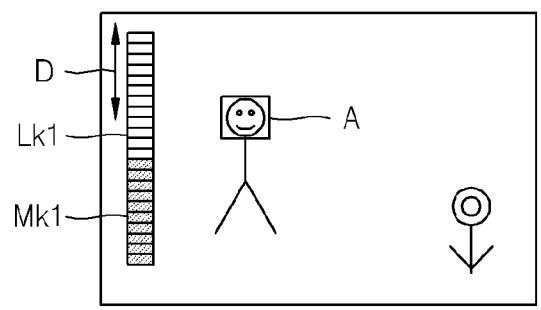

FIG. 18 is a diagram illustrating a FA in the form of a block image, according to another embodiment of the invention. In other words, the first information and the second information may be displayed in the form of a block image. The first information may be displayed in the form of a light-colored bar image Lk1, and the second information may be displayed in the form of a deep-colored bar image Mk1. A double-head arrow D may be displayed together with the first and second information so as to indicate vertical movement of the block image. FIG. 18 illustrates an example of a maximum value of a focus evaluation value.

Figure 19:
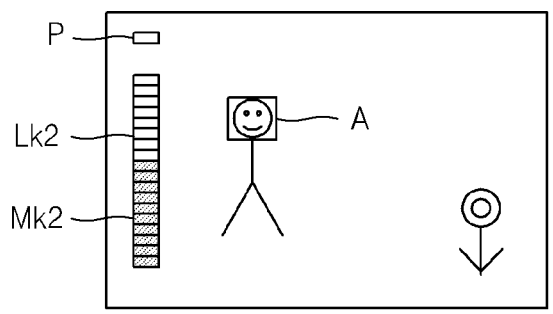
Figure 20:
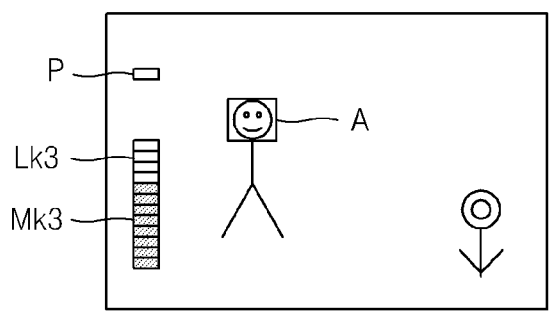

FIGS. 19 to 20 are diagrams illustrating different focus evaluation value information that may be obtained by a user manipulating a focus ring, according to embodiments of the invention. Specifically, referring to FIG. 19, first information and second information corresponding to a second focus evaluation value that a user obtains by manipulating the focus ring are indicated using block images Lk2 and Mk2. Referring to FIG. 19, the block images Lk2 and Mk2 are smaller than the block images Lk1 and Mk1 of FIG. 18, respectively. Since the first focus evaluation value of FIG. 18 is greater than the second focus evaluation value of FIG. 19, peak value information corresponding to the first focus evaluation value is displayed as a peak-hold, together with a line image P. For example, the peak value information may be held for two seconds.

Referring to FIG. 20, block images Lk3 and Mk3 are smaller than the block images Lk2 and Mk2 of FIG. 19, respectively. Since a third focus evaluation value corresponding to an image illustrated in FIG. 20 is less than the second focus evaluation value of FIG. 19, a subject corresponding to the image is out of focus.

Referring to FIGS. 18 to 20, although the first to third focus evaluation values are slightly different from one another, the pieces of the first information (minute part) thereof are definitely different from one another so that a user can recognize this difference. Thus, when the first to third focus evaluation values that are slightly different from one another due to manipulation of a focus ring by a user are displayed, each of the first to third focus evaluation values may be divided into a minute part and a coarse part so that the user may easily and exactly notice the slight difference between the first to third focus evaluation values.

Figure 21:
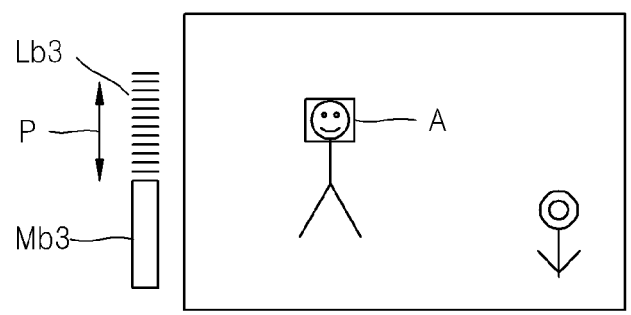

FIG. 21 is a diagram illustrating a method of displaying a focus evaluation value, according to another embodiment. Referring to FIG. 21, first information (minute part) is displayed in the form of a block image Lb3, the size of which may be vertically increased and reduced, and second information (coarse part) is illustrated in the form of a block image Mb3, outside a captured image of a subject.

Figure 22:
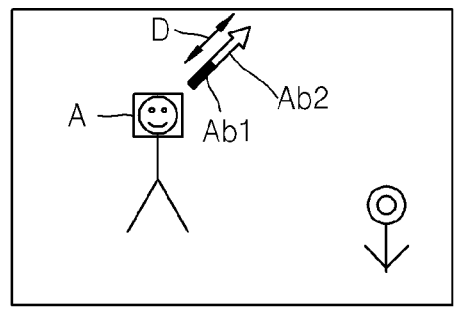

FIG. 22 is a diagram illustrating a method of displaying a focus evaluation value, according to another embodiment, in which the focus evaluation value is displayed near a focus region A by using an arrow bar image. For example, a FA is displayed in the form of an arrow bar image in a diagonal direction. Specifically, first information (minute part) may be displayed using a light colored image Ab2 of the arrow bar image, and second information (coarse part) may be displayed using a deep colored image Ab1 of the arrow bar image.

Figure 23:
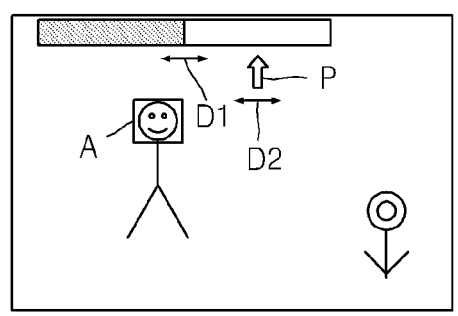

FIG. 23 is a diagram illustrating a method of displaying a focus evaluation value, according to another embodiment. In the method of FIG. 23, maximum values of first information (minute part) and second information (coarse part) corresponding to the focus evaluation value are displayed in the form of a bar image, a boundary between the first information and the second information is adjusted in a first horizontal direction D1, and a location corresponding to the focus evaluation value may be indicated using an arrow P moving in a second horizontal direction D2.

Figure 24:
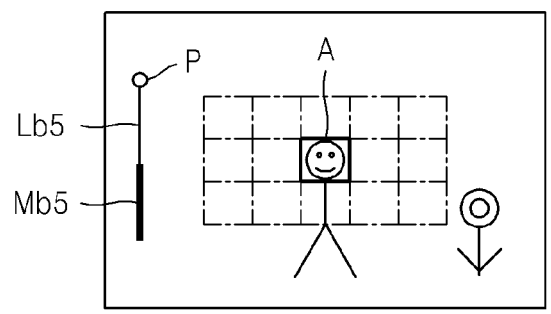
Figure 25:
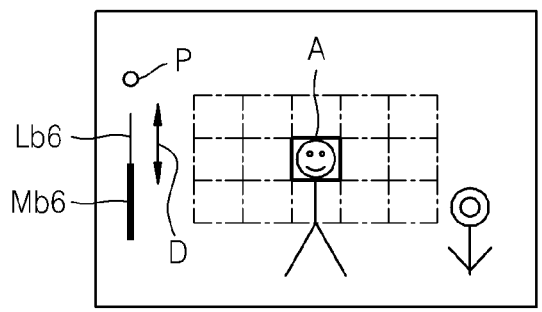

FIGS. 24 and 25 are diagrams illustrating methods of displaying a FA of a first focus evaluation value of a focus region A located at the center of an image, according to embodiments of the invention. In the methods of FIGS. 24 and 25, first information indicating an addend may be displayed using a fine line image and second information indicating an exponent may be displayed using a thick line image. Also, peak value information may be indicated using a circle P.

First, referring to FIG. 24, first information and second information of a first focus evaluation value are displayed using a fine line image Lb5 and a thick line image Mb5, respectively.

Referring to FIG. 25, first information and second information of a first focus evaluation value obtained by manipulating a focus ring are displayed using a fine line image Lb6 and a thick line image Mb6, respectively. The first focus evaluation value is peak-held, and peak value information 'o' P corresponding to the first focus evaluation value is also displayed.

Figure 26:
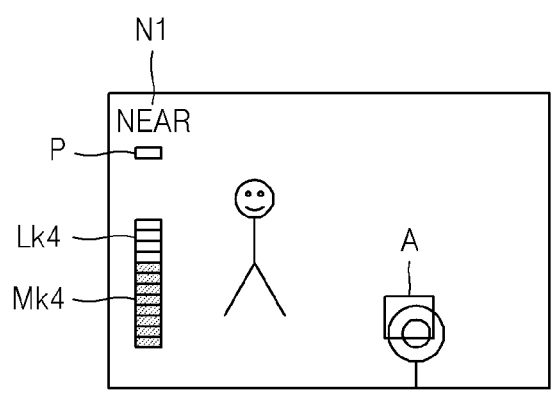

FIG. 26 is a diagram illustrating a method of displaying proximity information, according to an embodiment. Referring to FIG. 26, whether a subject is located in a proximity region may be determined by checking the distance between a location of a camera and the subject. The location of the image of the subject may be checked directly, for example, by using infrared rays but may be checked by determining whether the location of a focus lens related to the location of the subject falls within a specific location range of the focus lens that corresponds to the proximity region. In the current embodiment, an image of a flower near the subject is used as the focus region for obtaining the focus evaluation value.

If the location of the focus lens corresponds to the proximity region, a word 'NEAR' may be displayed as the proximity information. The proximity information may be displayed together with a light-colored block image Lk4 representing first information and a deep-colored block image Mk4 representing second information. In the current embodiment, an image P corresponding to peak value information is also displayed.

Figure 27:
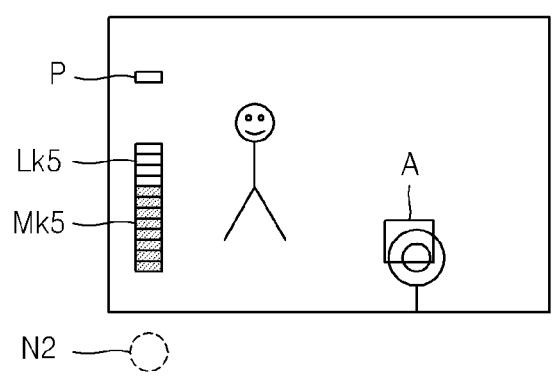

FIG. 27 is a diagram illustrating a method of displaying proximity information, according to another embodiment, in which the proximity information is displayed outside a captured image of a subject by using a dotted circle N2. In the current embodiment, block images Lk5 and Mk5 representing first information and second information, respectively, and an image P indicating peak value information are also displayed.

When the subject is located in a proximity region, it is may not be possible to present an exact peak value. When the focus lens is located at an end point of a moving range thereof, an obtained peak value may not be an exact peak value. In other words, a peak value that is more exact than the obtained peak value may exist. That is, an actual peak value may not be obtained when a digital camera approaches the subject. Thus, when the focus lens is located at an end point of the moving range thereof, which corresponds to the proximity region, proximity information may be displayed so that a user may recognize this fact.

In the current embodiment, the proximity information is displayed together with the first information and/or the second information, but the invention is not limited thereto and the peak value information may not be displayed when the subject is located in the proximity region, i.e., when the focus lens is located within the moving range thereof corresponding to the proximity.

Figure 28:
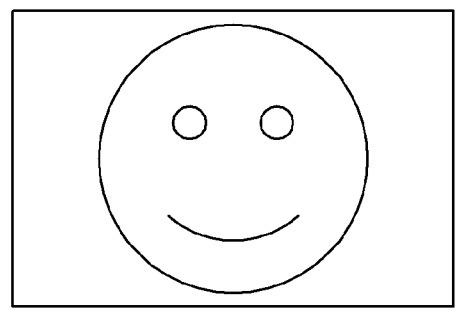

FIG. 28 is a diagram illustrating a case where first information and second information are displayed when an image of a subject is enlarged, according to an embodiment. Referring to FIG. 28, when the image is enlarged by focusing on a face included in the image, first information and second information corresponding to a focus evaluation value may not be displayed. When the image is enlarged, a FA may be deleted so that a focal state of the subject may be determined by directly checking an image included in a focus region of the image, but the invention is not limited thereto and a FA may not be deleted.

Figure 29:
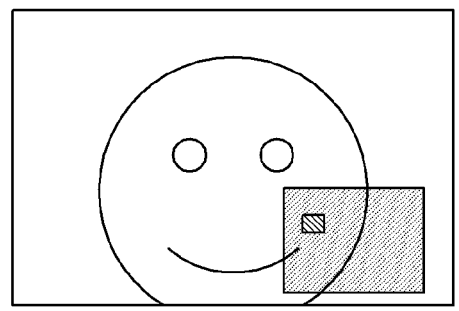

FIG. 29 is a diagram illustrating a case where when a non-central region of an image of a subject is enlarged, the location of the non-central region is displayed, according to an embodiment.

Figure 30:
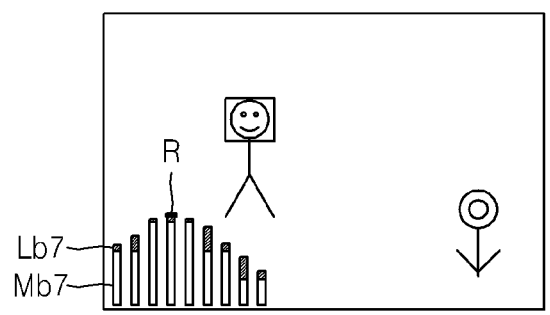

FIG. 30 is a diagram illustrating a method of displaying a FA, according to another embodiment. In the current embodiment, a current location R of a focus lens is displayed instead of the peak value information shown in the graph of FIG. 15. That is, if focus evaluation values representing a change in location of the focus lens moved by manipulating a focus ring in a first direction are sequentially displayed, detection evaluation values obtained by manipulating the focus ring are displayed, and the focus ring is manipulated in a second direction, then current location R of the focus lens needs to be further displayed since the focus evaluation values have been already obtained.

That is, in the current embodiment, a distribution of the focus evaluation values is displayed, and a user may thus easily check a focal state of the subject according to the location R of the focus lens.

In the embodiments described above, first information and second information are displayed in the form of an image so that a user may easily recognize them. However, the types of the images illustrated in the above embodiments are just examples, and the invention is not limited thereto. The first and second information may be displayed using various designs, colors, and layouts. Otherwise, the first and second information may be indicated by directly using numbers. Also, the first and second information may be provided to a user by using one of other various methods, e.g., in the form of an audio signal.

Operations included in a focusing method, according to embodiments, will now be described with reference to FIGS. 31 to 39.

Figure 31:
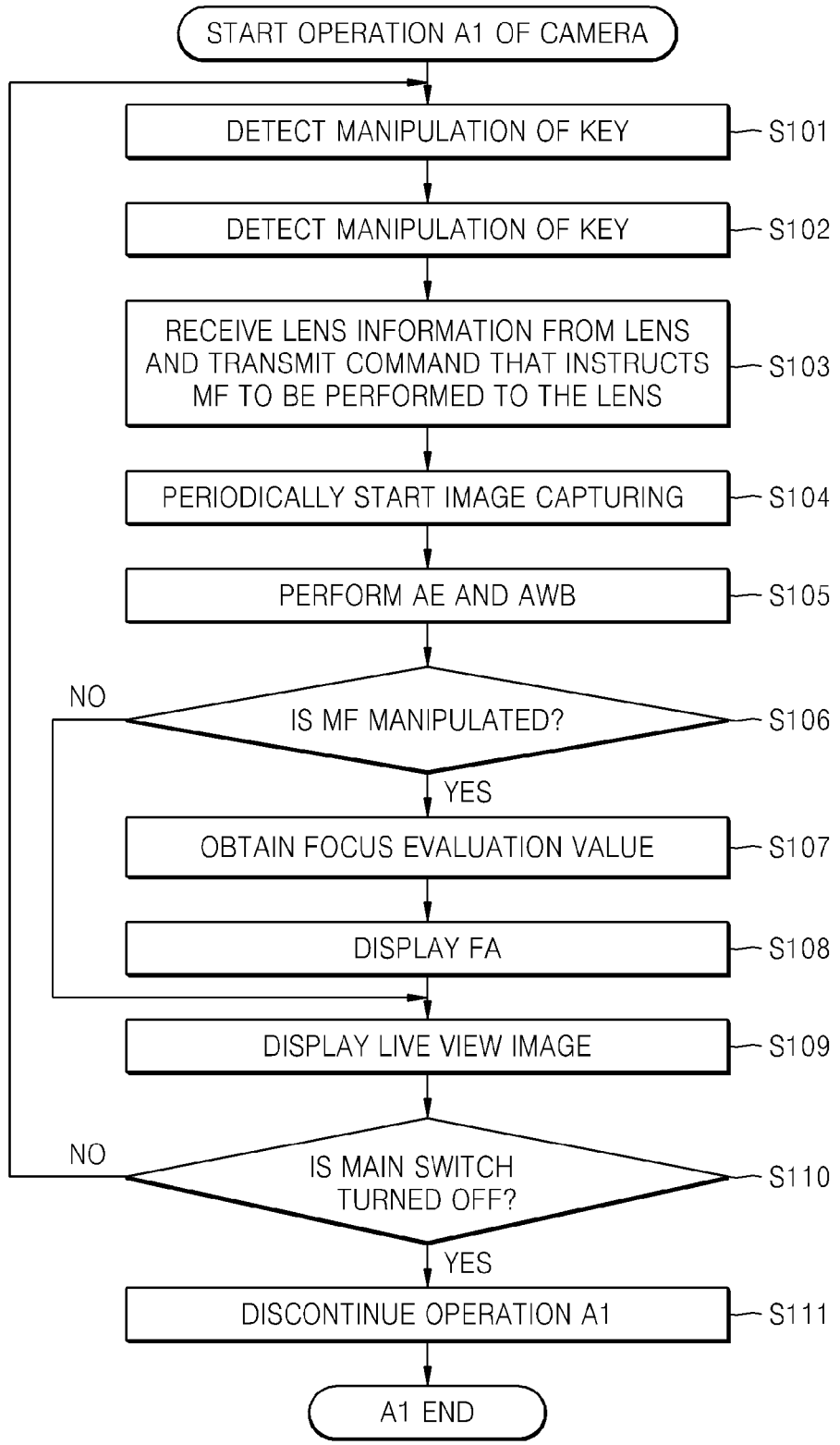
FIGS. 31 to 39 are flowcharts illustrating operations included in a focusing method, according to embodiments.

FIG. 31 is a flowchart illustrating operation A1 of a focusing method of a digital camera, according to an embodiment. When a main switch of the digital camera is turned on, the digital camera operates to detect manipulation of keys included in a manipulation unit (operation S101). A manipulation signal input by a user via one of the other various manipulation members, e.g., a mode dial, may be detected.

A mode of the digital camera, corresponding to the manipulation of the keys, is set (operation S102). For example, a still image shooting mode or a moving picture shooting mode may be set. The invention may be performed not only in the still image shooting mode but also in the moving picture shooting mode.

If the digital camera is an interchangeable lens digital camera, then lens information needed to operate the digital camera is received from an interchangeable lens, and a command that instructs MF to be performed by manipulating a focus ring is transmitted (operation S103). For example, AF, AE, and AWB which are unique parameters recorded on lens memory in a lens control circuit, and information needed for image control are received from the interchangeable lens. AF/MF setting information is received from an interchangeable lens in the case of an interchangeable lens digital camera but may be obtained by manipulating a key in the case of a lens-mounted digital camera. An AF or MF mode of the digital camera may be set based on the AF/MF setting information. AF may start in the AF mode by pressing an SR button in the half-pressed state, and focus control may start in the MF mode by manipulating the focus ring.

As will be described in detail below, information indicating whether a focus lens is located in a proximity region in relation to MF may also be obtained.

An imaging device periodically starts image capturing (operation S104).

AE is performed by performing light measurement, and AWB is performed (operation S105). Then, it is determined whether the focus ring is manipulated (operation S106). That is, in operation S106, it is determined whether manipulation is performed for MF.

If it is determined that manipulation is performed, focus evaluation values are obtained from image signals of a subject, which are periodically captured (operation S107).

Otherwise, if it is determined that manipulation is not performed, the method proceeds to operation S109.

Next, a FA that includes at least one from among first information and second information is displayed (operation S108). The FA may include peak value information, proximity information, enlargement information, in addition to the first information and the second information.

Next, a live view image is displayed (operation S109). The FA may be displayed together with the live view image.

Next, it is determined whether the main switch is turned off (operation S110). Operations S101 to S109 are performed again when it is determined that the main switch SM is not turned off, and operation A1 of the digital camera is discontinued when it is determined that the main switch is turned off (operation S111). Then, operation A1 of the method ends.

Figure 32:
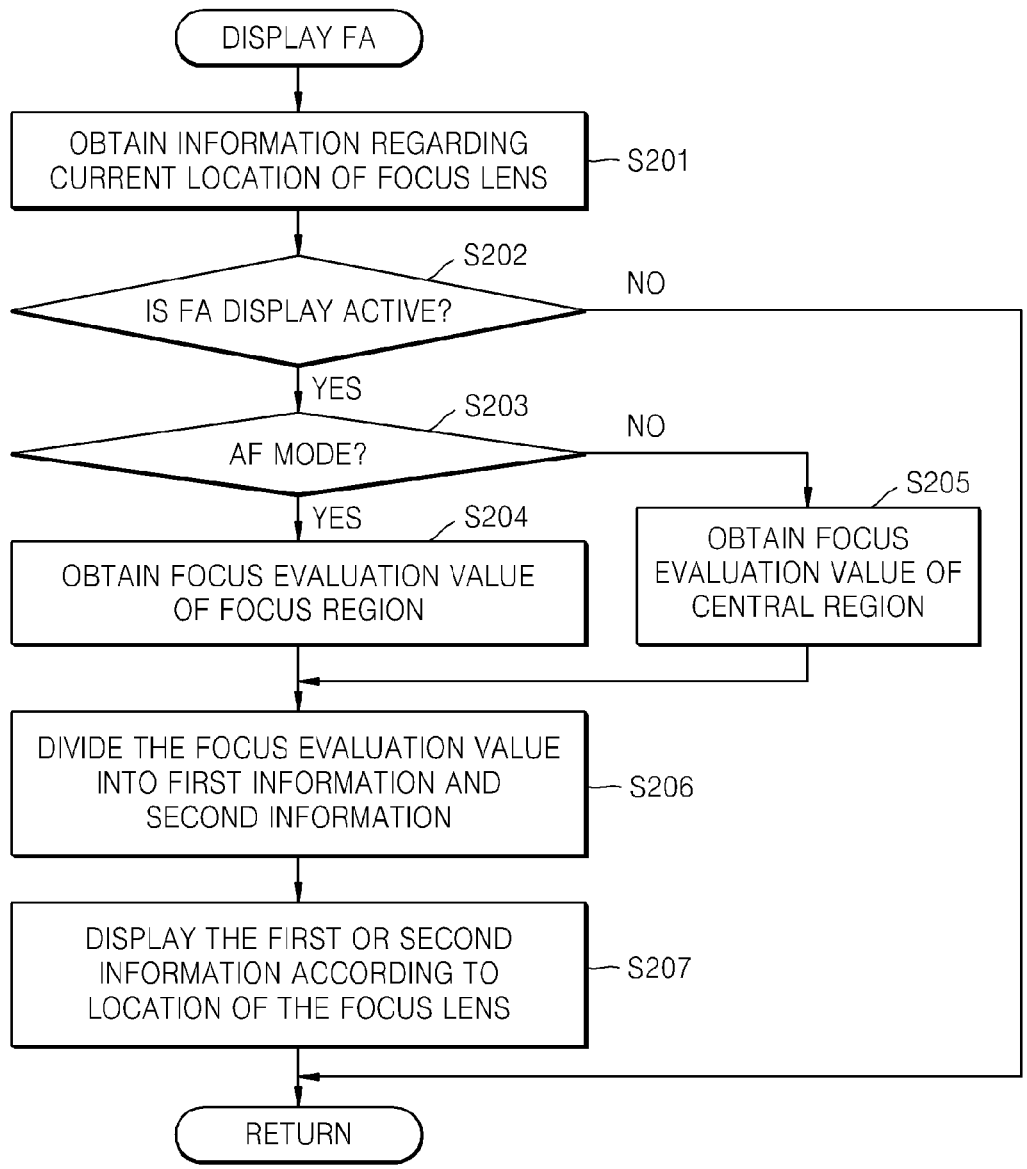

FIG. 32 is a flowchart specifically illustrating operation S108 of displaying the FA, which is included in operation A1 of FIG. 31, according to an embodiment.

Referring to FIG. 32, information regarding current location of a focus lens is obtained (operation S201).

Next, it is determined whether a FA display is activated (operation S202). The FA is information that is preset as a menu item. If the FA is not activated, the method returns back to operation S101 of FIG. 31.

Otherwise, if the FA is activated, it is determined whether a current mode is an AF mode (operation S203).

If the current mode is the AF mode, a focus evaluation value of a set focus region is obtained (operation S204). The focus region may be a region of an image of a subject selected by a user, may be an image region of the subject that is automatically obtained, or may be an image region (face region) of the subject recognized according to a subject recognition algorithm, e.g., a face algorithm.

Otherwise, if the current mode is not the AF mode, then a default central region of the image of the subject is determined as a focus region and a focus evaluation value of the central region is obtained (operation S205). The default central region of the image of the subject may also be set as a focus region when a region of the image of the subject is not automatically obtained in an AF mode.

Next, the focus evaluation value is divided into first information (minute part) and second information (coarse part) (operation S206). In an embodiment, the minute part is information, e.g., an addend, which represents the difference between focus evaluation values to be relatively large. The coarse part is information, e.g., an exponent, which represents the difference between focus evaluation values to be relatively small.

Next, a distribution of focus evaluation values according to the location of a focus lens is displayed using at least one from among a distribution of the first information and a distribution of the second information (operation S207). If the focus lens is moved in one direction and is then moved in another direction, information regarding current location of the focus lens may further be displayed together with the distribution of focus evaluation values because the obtained focus evaluation value may be used. Then, the method returns back to operation 109 of FIG. 31.

Figure 33:
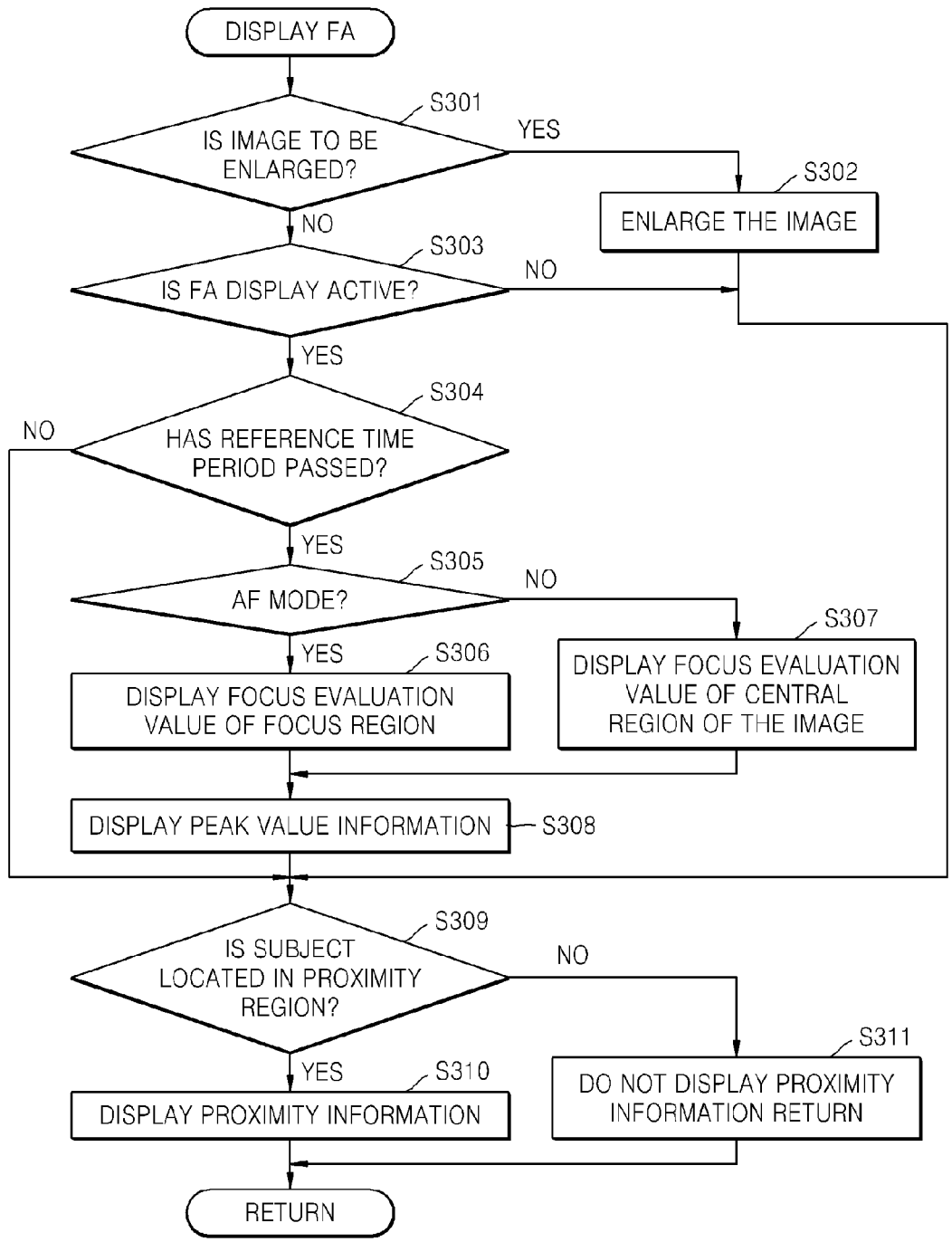

FIG. 33 is a flowchart specifically illustrating operation S108 of displaying the FA, which is included in operation A1 of FIG. 31, according to another embodiment. Referring to FIG. 33, it is determined whether an image of a subject is to be enlarged through a user's manipulation (operation S301).

If the image is to be enlarged, the enlarged image is displayed (operation S302). For example, the image may be enlarged for five seconds. The system is reset for five seconds whenever the image is enlarged. In other words, the enlargement of the image is continued while MF is performed, and is discontinued five seconds after MF is determined not to be performed.

Otherwise, if the image is not to be enlarged, it is determined whether a FA display is activated (operation S303).

If the FA display is activated, it is determined whether a reference time period has passed (operation S304). The reference time period may be, for example, 50 ms and may be a cycle period of updating the FA. The reference time period may be sensitivity of the FA.

Otherwise, if the reference time period has passed, it is determined whether a current mode is an AF mode (operation S305).

If the current mode is the AF mode, a focus evaluation value of a focus region that is selected by a user or is automatically set is displayed (operation S306).

Otherwise, if the current mode is not the AF mode, a focus evaluation value of a default region, e.g., a focus region of a central region of the image, is displayed (S307).

Specifically, at least one from among first information (minute part) and second information (coarse part) of the focus evaluation value may be provided to a user. The focus evaluation value may be displayed in such a manner that the first information (minute part) and the second information (coarse part) are differentiated from each other or may not be differentiated from each other. In some cases, the focus evaluation value may be displayed by using only one of the first and second information. When the difference between focus evaluation values is slight, at least the first information regarding the minute part may be displayed from among the first and second information. In the current embodiment, the first and second information are displayed in the form of an image so as to provide a user with the focus evaluation value.

In addition to the focus evaluation value, a maximum value from among focus evaluation values obtained for a predetermined time period, i.e., for one second, is also continuously displayed. That is, a peak value being previously obtained for one second is displayed. Such an operation is referred to as 'peak holding'. Peak value information corresponding to the peak value is displayed (operation S308). The focus evaluation value and the peak value information may be displayed sequentially or concurrently.

After the image is enlarged, if it is determined in operation S303 that the FA is not activated, or if it is not determined in operation S304 that the reference time period has passed, then it is determined whether the subject is located in a proximity region (operation S309). Otherwise, if it is not determined in operation S304 that the reference time period has passed, then it is determined whether the proximity region is to be displayed so as to not update the FA. The determination of whether the proximity region is to be displayed is performed so as to prevent the FA from being updated frequently and to stably display the FA, thereby allowing a focus ring to be manipulated easily.

Operation S309 may correspond to determining of whether the focus lens is located in the proximity region.

If it is determined that the subject is located in a proximity region, proximity information is displayed (operation S310). Otherwise, if it is determined that the subject is not located in a proximity region, the proximity information may not be displayed (operation S311).

Then, the method returns back to operation S109 of FIG. 31.

Figure 34:
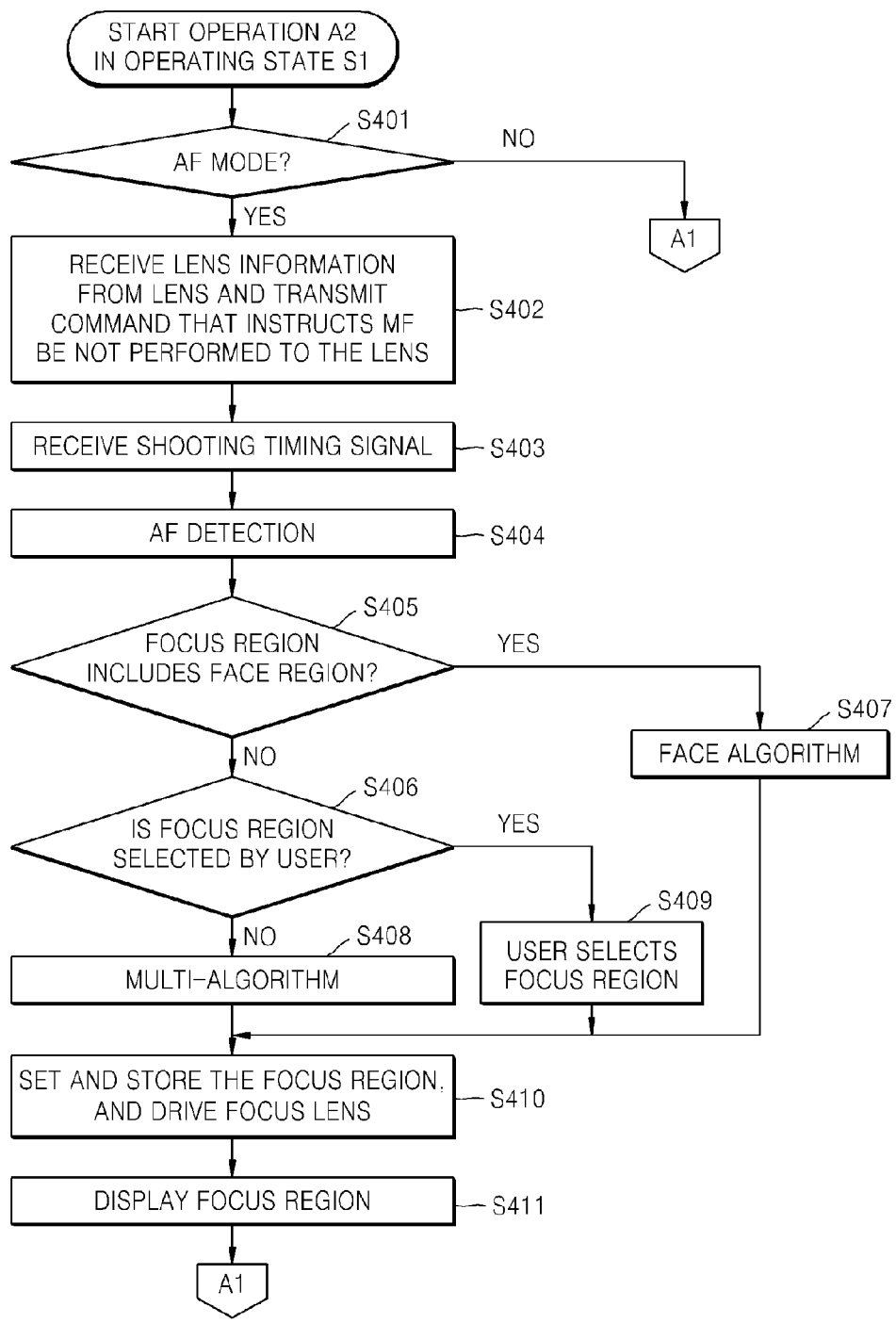

FIG. 34 is a flowchart illustrating operation A2 of the focusing method of a digital camera in an operating state S1, in which a SR button is pressed to the half-pressed state, according another embodiment. Referring to FIG. 34, operation A2 of the digital camera that is in the operating state S1 starts.

First, it is determined whether a current mode is an AF mode (S401). If the current mode is not the AF mode, i.e., if the current mode is a MF mode, then the method returns back to operation A1 of the method described above with reference to FIG. 31.

If the current mode is the AF mode, lens information is received from a focus lens and a command that instructs MF be not performed in the AF mode is provided (operation S402). Next, a shooting timing signal is provided so as to start a scanning operation for detecting a peak value from among contrast values that are focus evaluation values (operation S403). The shooting timing signal may indicate a timing that AF detection will start and may be generated when location of a focus region is set.

An imaging device AF detects a scan line of the focus region from a focus evaluation value obtaining unit of a pre-processor of a camera control circuit (operation S404).

Then, it is determined whether a current mode is a focus region setting mode (operation S405). For example, if it is determined in operation S405 that the current mode is a focus region setting mode in which the focus region includes a face region, then a face algorithm is performed (operation S407).

Figure 35:
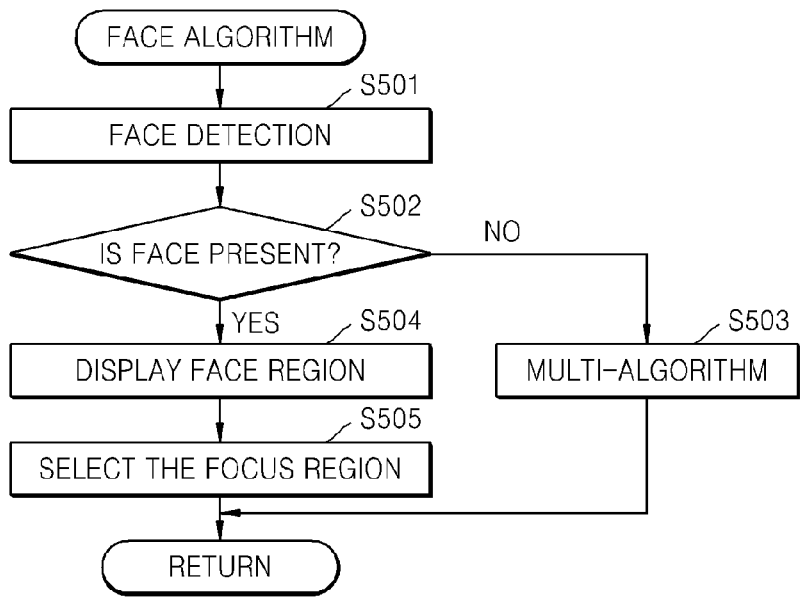

The face algorithm is described as follows with reference to FIG. 35. Referring to FIG. 35, face detection is performed (operation S501). In relation to the face detection, the subject recognition unit 221-1 of the signal processor 221 of FIG. 6 detects face information whenever image information is received, and thus, latest face information may be obtained. In addition, previous face information may also be used. Also, a plurality of faces may be detected.

Next, it is determined whether a face is present in an image of a subject (operation S502). If a face is not present, a multi-algorithm is performed (operation S503). Otherwise, if a face is present, a face region of the image is displayed (operation S504). That is, an area including the detected face may be displayed.

A focus region may be selected including at least one part of the face region (operation S505). If a plurality of faces is detected, a face having a maximum size may be selected from among the plurality of faces. That the face having the maximum size is selected means a face closest to the digital camera is focused.

Referring back to FIG. 34, otherwise, if it is determined that the current mode is not the focus region setting mode, then it is determined whether the current mode is a spot mode in which a user selects a focus region (operation S406). If the current mode is the spot mode, a user selects a focus region (operation S409).

Otherwise, if the current mode is not the spot mode, the multi-algorithm is performed (operation S408).

Figure 36:
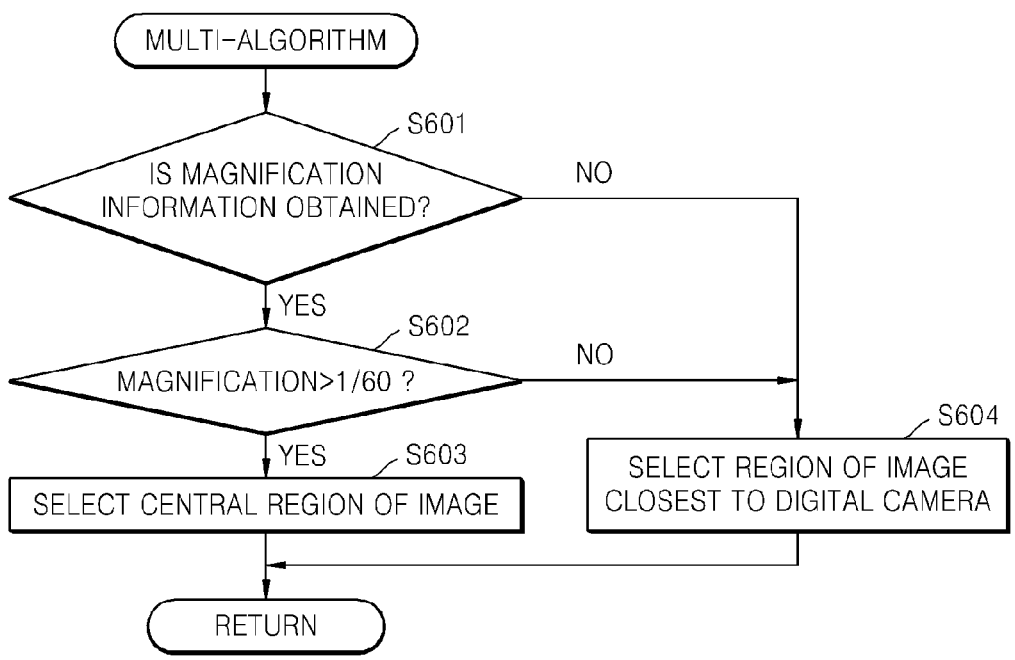

The multi-algorithm is described in detail as follows with reference to FIG. 36. Referring to FIG. 36, first, it is determined whether magnification information of a central region of a captured image of a subject is obtained (operation S601). If the magnification information is obtained, it is determined whether the magnification is equal to or greater than (or is greater than) 1/60 (operation S602). If the magnification is equal to or greater than 1/60, the central region of the image is selected as a focus region (operation S603). Otherwise, if the magnification is less than (or is less than or equal to 1/60, a region of the image closest to the digital camera is selected as a focus region (operation S604).

After the selected region is set as the focus region, the method proceeds to operation S410 of FIG. 31.

Referring back to FIG. 34, the focus region is set and stored, and a focus lens is then driven (operation S410). When the focusing is finished, the focus region may be outlined using a different color, e.g., green (operation S411).

Then, the method returns back to operation A1 illustrated in FIG. 31, and displaying of a live view image is repeated. Since performing of MF is allowed in operation A1, MF may be performed after AF is performed.

Figure 37:
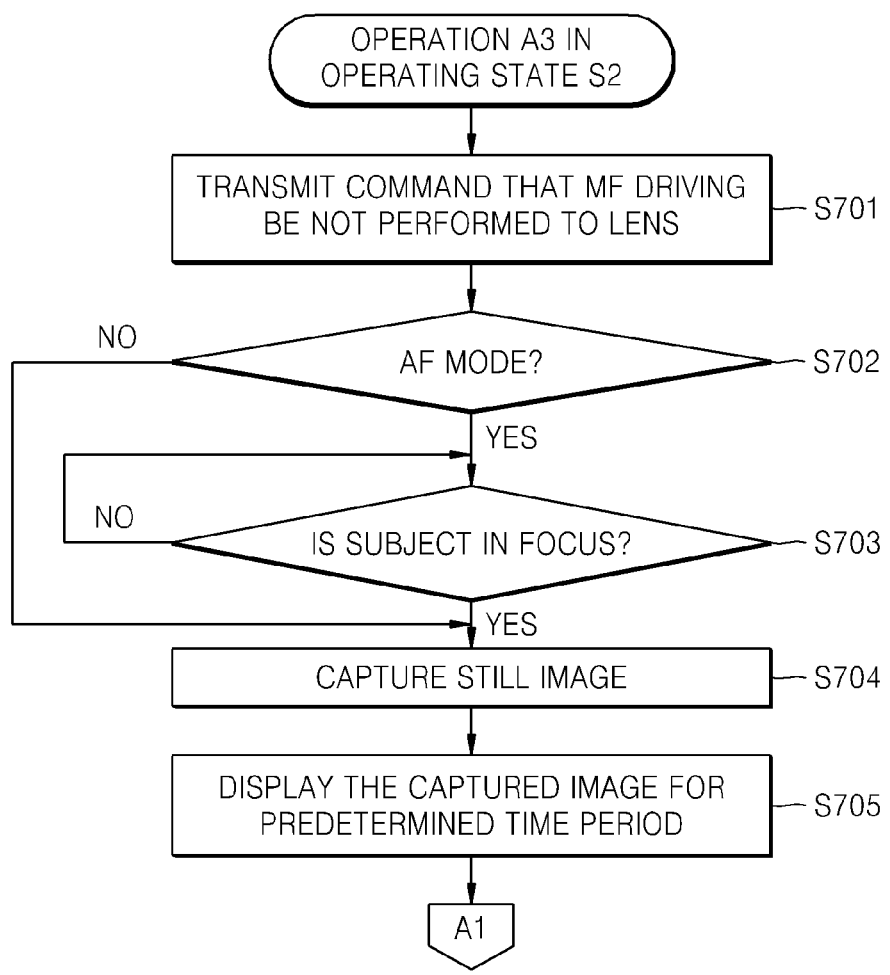

FIG. 37 is a flowchart illustrating operation A3 of the focusing method of a digital camera in an operating state S2, in which a SR button is pressed to the full-pressed state, according to another embodiment.

In the current embodiment, after AF is completed or while a live view image is displayed in a MF mode, the SR button is pressed to the full-pressed state so as to turn on the state S2, and then, the operation A3 of the digital camera starts.

When the state S2 is 'on', a command that MF driving be not performed is input to a focus lens (operation S701) to prevent the state of a still image from being changed when the still image is captured.

Next, it is determined whether a current mode is the AF mode (operation S702).

If the current mode is the AF mode, then when the state S2 is 'on' before a subject is in focus, the still image is captured after a focus lens focuses the subject (operation S703). Otherwise, if the current mode is not the AF mode, i.e., if the current mode is the MF mode, then operation S703 is skipped and the method proceeds to operation S704. That is, the still image is captured (operation S704).

After the captured image is displayed for a predetermined time period (operation S705), the method returns back to operation A1 of the method described above with reference to FIG. 31, and displaying of the live view image is repeated.

Figure 38:
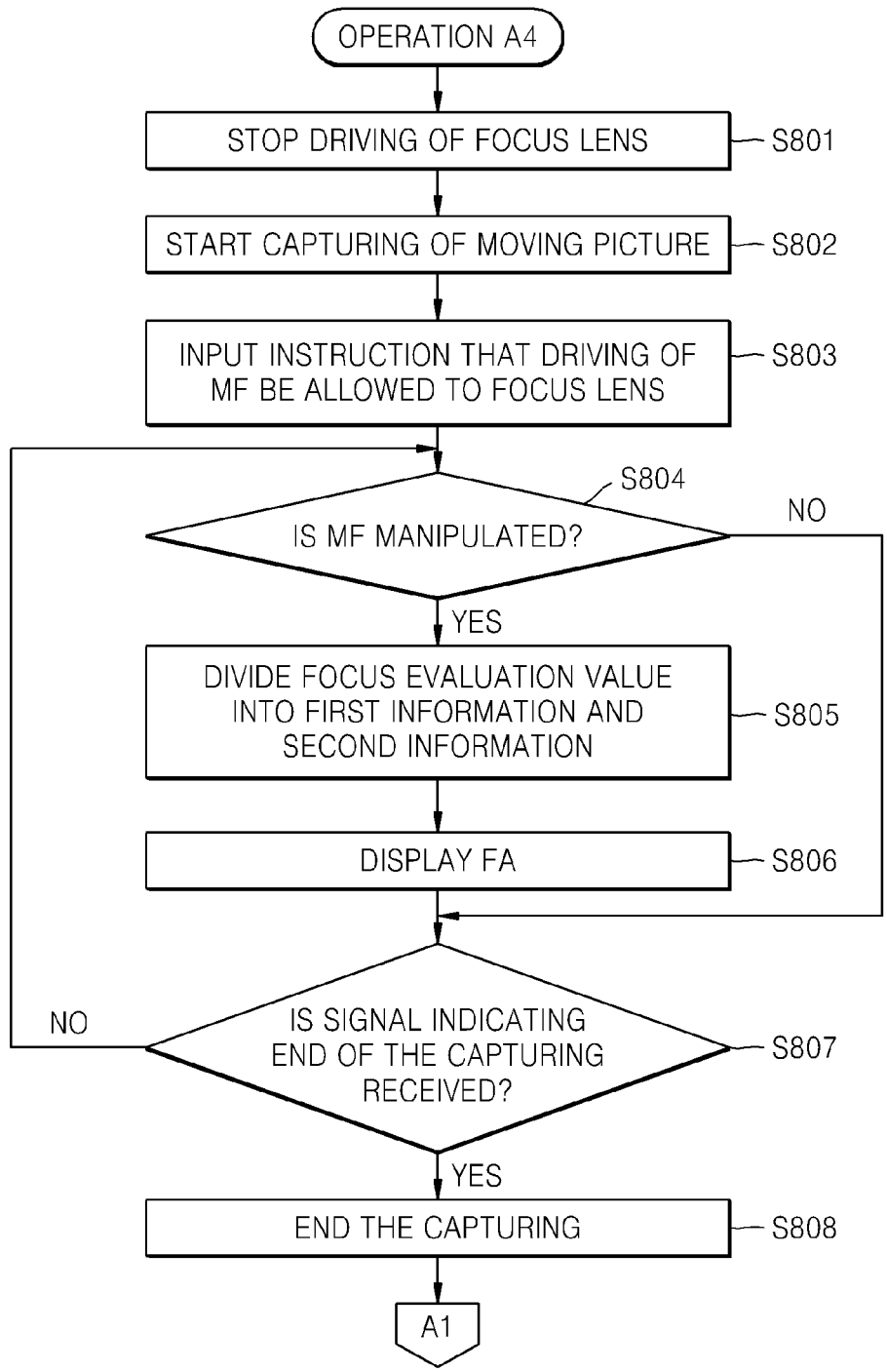

FIG. 38 is a flowchart illustrating an operation A4 of capturing a moving picture, according to an embodiment of the invention. Referring to FIG. 38, when a button that is a moving picture capturing button is turned on, the operation A4 starts.

First, an instruction that driving of a focus lens be stopped is transmitted to the focus lens (operation S801). AF driving may be discontinued before capturing of a moving picture starts.

Next, capturing of the moving picture starts (operation S802).

After capturing of the moving picture starts, an instruction that driving of MF is allowed is input to the focus lens (operation S803). A user (photographer) may manipulate the driving of MF at an appropriate timing when focus control is needed during capturing of a moving picture.

It is determined whether MF is being manipulated (operation S804). If MF is being manipulated, a focus evaluation value according to the manipulation is obtained and is calculated to divide the focus evaluation value into an addend and an exponent (operation S805). Then, first information representing the addend and second information representing the exponent are displayed, that is, a FA is displayed (operation S806). Displaying of the FA has been described above with reference to FIGS. 20 to 29.

Then, it is determined whether a signal indicating end of the capturing of the moving picture is received (operation S807). Next, it is determined whether the moving picture capturing button is 'on' or 'off', and the capturing of the moving picture ends when the moving picture capturing button is 'off' (operation S808). If the moving picture capturing button switch is 'on', the method returns back to operation S804 to determine whether manipulation of MF is detected. If manipulation of MF is not detected, the method returns back to operation S807 to determine whether the signal indicating end of the capturing of the moving picture is received.

Although not described in relation to the current embodiment, displaying of a live view image may be repeated by performing AE and AWB during capturing of the moving picture.

Figure 39:
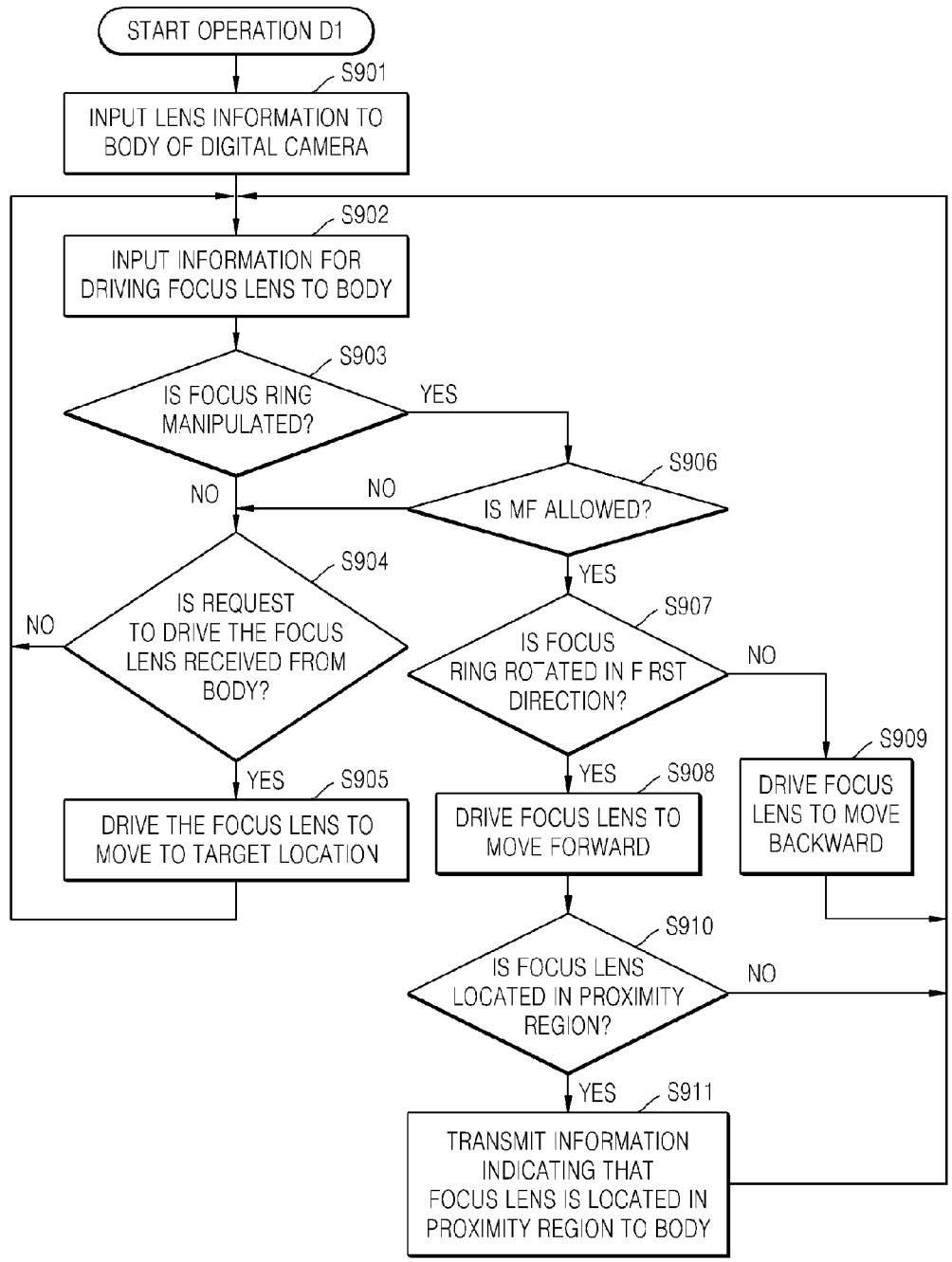

FIG. 39 is a flowchart illustrating an operation of an interchangeable lens included in a digital camera, according to an embodiment. Referring to FIG. 39, when the interchangeable lens starts to operate, first, driving of a body of the digital camera starts. Referring to FIG. 39, lens information is input to the body of the digital camera (operation S901). The lens information is information needed for the body of the digital camera to use the interchangeable lens, e.g., AF, AE, AWB, and information for image control.

Next, information needed to drive the focus lens is input to the body of the digital camera (operation S902). For example, this information may include a command that allows MF to be performed or not to be performed, and driving information for performing AF.

Next, it is determined whether a focus ring is manipulated (operation S903). If it is determined that the focus ring is manipulated, a pulse signal is generated. Whether the focus ring is manipulated may be determined based on the pulse signal.

If it is determined that the focus ring is manipulated, whether MF is allowed is determined based on the information from the body of the digital camera (operation S906).

If MF is allowed, a direction in which the focus ring is rotated is determined (operation S907). For example, whether the focus ring is rotated in a first direction may be determined. For example, whether the focus ring is rotated in the clockwise direction may be determined. If the focus ring is rotated in the first direction, e.g., the right direction, then the focus lens is driven to move forward (operation S908). Otherwise, if the focus ring is rotated in a second direction, e.g., the counterclockwise direction, then the focus lens is driven to move backward (operation S908).

If the focus lens is driven to move forward, it is determined whether the focus lens is located in a proximity region (operation S910).

Information regarding whether the focus lens is located in the proximity region is transmitted to the body of the digital camera (operation S911). Then, the method returns back to operation S902.

If it is determined in operation S906 that MF is not allowed or if it is determined in operation S903 that manipulation of the focus ring is not detected, then it is determined whether for AF, a request to drive the focus lens is received from the digital camera (operation S904).

If the request is received, the focus lens is driven to move to a target location (operation S905). Otherwise, if the request is not received, the method returns back to operation S902. Driving of the focus lens includes search driving for performing contrast AF and focus driving for moving the focus lens to a focus location. The focus lens may be driven to move to the target location by performing search driving and focus driving.

The driving of the focus lens may be forced to be discontinued when the digital camera is not powered on or when the focus lens is separated from the digital camera.

Focusing methods according to the invention may be embodied as computer-readable code in a computer-readable recording medium. The computer-readable recording medium may be any recording apparatus capable of storing data that is read by a computer system.

For example, the computer-readable recording medium may be flash memory.

Examples of a focusing apparatus according to the invention include a processor, memory for storing and executing program data, a communication port for communicating with an external device, a touch panel, or a user interface device, such as keys or buttons.

Methods according to the invention that may be embodied as a software module or an algorithm may be embodied as computer-readable code or program commands that are read by a processor-readable computer and may be stored in a computer-readable recording medium. The computer-readable recording medium may be a magnetic storage medium. The computer-readable recording medium may be distributed among computer systems that are interconnected through a network, and the invention may be stored and implemented as computer-readable code. The computer-readable code or program commands may be read by a computer, may be stored in flash memory, and may be executed by a processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements the invention may be implemented with any programming or scripting language such as C, C++, Java, assembler, or the like, with the various algorithms being implemented with any combination of data structures, objects, processes, routines, or other programming elements. Functional aspects may be implemented in algorithms that execute on one or more processors. Furthermore, the invention could employ any number of conventional techniques for electronics configuration, signal processing and/or control, data processing, and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar references in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the invention.

According to the above embodiments of the invention, a focus evaluation value is displayed by dividing the focus evaluation value into first information representing the difference between focus evaluation values to be relatively large and second information representing the difference to be relatively small. Accordingly, even a minute difference between focus evaluation values obtained by finely manipulating a focus ring may be accurately checked. For example, even if the difference between focus evaluation values that are numbers of several hundred digits, several thousand digits, or several tens of thousand digits is a number of one digit or ten digits, the difference may be easily and accurately checked.

What is claimed is:

1. A focusing apparatus comprising:
   a focus lens;
   a focus lens driving unit to move the focus lens in an optical axial direction;
   an imaging device to generate an image signal by transforming light of an image of a subject, which is incident on the focus lens, into an electrical signal;
   a focus evaluation value obtaining unit to obtain a focus evaluation value in relation to the image signal;
   an information generation unit to generate first information and second information from the obtained focus evaluation value, wherein the first information represents a difference between focus evaluation values, which are obtained according to a location of the focus lens, to be relatively large, and the second information represents the difference to be relatively small; and
   a providing unit to provide the first information and the second information.

2. The focusing apparatus of claim 1, wherein the first information and the second information are an addend and an exponent of the obtained focus evaluation value, respectively.

3. The focusing apparatus of claim 1, wherein the first information comprises a linear arithmetic value of an addend of the obtained focus evaluation value, and the second information comprises a linear arithmetic value of an exponent of the obtained focus evaluation value.

4. The focusing apparatus of claim 1, wherein the providing unit is to express the first information and the second information in graphics each corresponding to a linear arithmetic value according to a linear equation, where the greater the obtained focus evaluation value, the greater the linear arithmetic value according to the linear equation.

5. The focusing apparatus of claim 1, wherein the providing unit is to display the first information and the second information to be differentiated from each other.

6. The focusing apparatus of claim 1, wherein the providing unit is to display the first information and the second information to not be differentiated from each other.

7. The focusing apparatus of claim 1, wherein the first information comprises a number of significant binary figures of the obtained focus evaluation value, and the second information comprises a shift number of the binary figures.

8. The focusing apparatus of claim 1, wherein the focus lens driving unit is to move the focus lens according to a user's manipulation.

9. The focusing apparatus of claim 1, further comprising a peak-hold unit to generate peak value information corresponding to a peak value from among the first and second information, and
wherein the providing unit is to provide the peak value information.

10. The focusing apparatus of claim 1, wherein the providing unit is to provide a change in at least one of the first or second information of the focus evaluation values according to at least one of the location of the focus lens, or a change in the first and second information.

11. The focusing apparatus of claim 1, further comprising a proximity determination unit to determine whether the subject is located in a proximity region,
wherein, if the subject is located in the proximity region, the providing unit is to at least one of provide proximity information or not provide peak value information corresponding to a peak value from among the first and second information.

12. The focusing apparatus of claim 1, further comprising an image enlargement determination unit to determine whether an image corresponding to the image signal is to be enlarged,
wherein, if the image is to be enlarged, the providing unit is to provide enlargement information of the image or is not to provide the first information and the second information.

13. The focusing apparatus of claim 1, wherein the providing unit comprises a display unit to display the first information and the second information.

14. The focusing apparatus of claim 13, wherein each of the first information and the second information is displayed in the form of at least one of a bar image, a block image, or an arrow image.

15. The focusing apparatus of claim 1, wherein the providing unit comprises a speaker to provide the first information and the second information in the form of an audio signal.

16. The focusing apparatus of claim 1, further comprising a focus region setting unit to set a focus region of the image corresponding to the image signal, from which the obtained focus evaluation value is obtained,
wherein the focus evaluation value setting unit is to obtain the focus evaluation value from the focus region.

17. The focusing apparatus of claim 16, wherein the focus region setting unit is to set a central region of the image as the focus region.

18. The focusing apparatus of claim 16, further comprising a manipulation unit to generate a user input signal for setting the focus region,
wherein the focus region setting unit is to set the focus region, based on the user input signal.

19. The focusing apparatus of claim 16, further comprising a subject recognition unit to recognize a subject region from the image signal, and
wherein the focus region setting unit is to set the focus region to include at least one part of the recognized subject region.

20. The focusing apparatus of claim 19, wherein the subject recognition unit is to recognize a face region, based on the image signal.

21. The focusing apparatus of claim 16, wherein the focus region setting unit is to set the focus region based on the image signal and according to an automatic multi-division focus region obtaining algorithm.

22. A focusing method comprising:
generating an image signal by transforming light of an image of a subject, which is incident on the focus lens, into an electrical signal;
obtaining a focus evaluation value in relation to the image signal;
generating first information and second information from the obtained focus evaluation value, wherein the first information represents a difference between focus evaluation values, which are obtained according to location of the focus lens, to be relatively large, and the second information represents the difference to be relatively small; and
providing the first information and the second information.

23. The focusing method of claim 22, wherein the first information and the second information are an addend and an exponent of the obtained focus evaluation value, respectively.

24. The focusing method of claim 22, wherein the first information comprises a linear arithmetic value of an addend of the obtained focus evaluation value, and the second information comprises a linear arithmetic value of an exponent of the obtained focus evaluation value.

25. The focusing method of claim 22, wherein the first information comprises a number of significant binary figures of the obtained focus evaluation value, and the second information comprises a shift number of the binary figures.

26. The focusing method of claim 22, further comprising moving the focus lens according to a user's manipulation.

27. The focusing method of claim 22, further comprising:
generating peak value information corresponding to a peak value from among the first and second information; and
providing the peak value information.

28. The focusing method of claim 22, wherein the providing of at least one of the first or the second information comprises providing a change in the first or second information of the focus evaluation values according to at least one of the location of the focus lens, or a change in the first information and the second information.

29. The focusing method of claim 22, further comprising:
determining whether a subject is located in a proximity region; and
if the subject is located in the proximity region, at least one providing proximity information or canceling the providing of peak value information.

30. The focusing method of claim 22, further comprising:
determining whether the image corresponding to the image signal is to be enlarged; and
if the image is to be enlarged, at least one providing enlargement information of the image or canceling the providing of the peak value information.

31. The focusing method of claim 22, wherein the providing of at least one of the first and the second information comprises displaying at least one of the first and second information.

32. The focusing method of claim 31, wherein each of the first information and the second information is displayed in the form of at least one of a bar image, a block image, or an arrow image.

33. The focusing method of claim 22, further comprising:
setting a focus region of the image corresponding to the image signal, from which the obtained focus evaluation value is obtained; and
obtaining the focus evaluation value from the focus region.

34. The focusing method of claim 22, wherein a central region of the image is set as the focus region.

35. The focusing method of claim 34, wherein the focus region is set according to a user input signal.

36. The focusing method of claim 34, further comprising:
recognizing a subject region from the image signal; and
setting the focus region to include at least one region of the recognized subject region.

37. The focusing method of claim 36, wherein a face region is recognized based on the image signal.

38. The focusing method of claim 34, further comprising setting the focus region based on the image signal and according to an automatic multi-division focus region obtaining algorithm.

39. A non-transitory computer-readable recording medium having recorded thereon a computer program for executing the method of claim 22.

* * * * *